United States Patent
Kim et al.

(10) Patent No.: US 11,310,189 B1
(45) Date of Patent: *Apr. 19, 2022

(54) METHOD AND SYSTEM TO CONVERSE ACROSS FRAGMENTED MESSAGING SERVICES BASED ON DISCUSSION TOPICS

(71) Applicant: Medallia, Inc., San Francisco, CA (US)

(72) Inventors: Mansu Kim, San Jose, CA (US); Dasol Kim, San Jose, CA (US)

(73) Assignee: Medallia, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/143,983

(22) Filed: Jan. 7, 2021

Related U.S. Application Data

(63) Continuation of application No. 16/007,889, filed on Jun. 13, 2018, now Pat. No. 10,924,447.

(60) Provisional application No. 62/519,572, filed on Jun. 14, 2017.

(51) Int. Cl.
*G06F 15/16* (2006.01)
*H04L 51/56* (2022.01)
*H04L 51/52* (2022.01)

(52) U.S. Cl.
CPC .............. *H04L 51/36* (2013.01); *H04L 51/32* (2013.01)

(58) Field of Classification Search
CPC .............................. H04L 51/36; H04L 51/046
USPC ......................................................... 709/206
See application file for complete search history.

(56) References Cited

U.S. PATENT DOCUMENTS

| | | | | |
|---|---|---|---|---|
| 7,624,165 B2 * | 11/2009 | Tucker | .................. | H04W 36/28 709/223 |
| 8,595,290 B2 * | 11/2013 | Weinryb | ................. | H04L 51/32 709/203 |
| 8,914,451 B2 * | 12/2014 | Langlois | ................. | H04L 51/04 709/206 |
| 8,918,085 B2 | 12/2014 | Lew et al. | | |
| 9,219,704 B2 | 12/2015 | Hamlin et al. | | |
| 2003/0037102 A1 * | 2/2003 | Eckert | ..................... | H04L 67/14 709/203 |
| 2007/0067396 A1 * | 3/2007 | Blinn | ................... | G06Q 10/107 709/206 |
| 2009/0016504 A1 | 1/2009 | Mantell et al. | | |

(Continued)

OTHER PUBLICATIONS

EP International Search Report dated Feb. 8, 2021, EP application No. 18817186, 10 pages.

*Primary Examiner* — Anthony Mejia

(57) ABSTRACT

Conversing across fragmented messaging services based on a discussion topic is disclosed. In an embodiment, a method includes receiving, via a first messaging channel and at a message aggregator, a first message from a first messaging service. The first message is sent by a first user. The method includes sending the first message to a second user via a second messaging channel, then receiving, via the second messaging channel and at the message aggregator, a second message. The second message is sent by the second user. In response to a request from the first user to continue a conversation via a second messaging service, the method opens a third messaging channel to the second messaging service. The third messaging channel is associated with an account of the first user on the second messaging service. The method includes sending the second message via the third messaging channel to the second user.

27 Claims, 13 Drawing Sheets

(56) References Cited

U.S. PATENT DOCUMENTS

| | | | |
|---|---|---|---|
| 2009/0325609 A1* | 12/2009 | Rosen | H04L 51/34 |
| | | | 455/466 |
| 2010/0093379 A1* | 4/2010 | Neely | H04L 67/2814 |
| | | | 455/466 |
| 2010/0250955 A1* | 9/2010 | Trevithick | G06F 21/33 |
| | | | 713/185 |
| 2012/0221962 A1* | 8/2012 | Lew | H04L 61/605 |
| | | | 715/752 |
| 2013/0055099 A1 | 2/2013 | Yao et al. | |
| 2013/0157624 A1 | 6/2013 | Talwar et al. | |
| 2013/0173962 A1* | 7/2013 | Li | H04L 67/10 |
| | | | 714/32 |
| 2013/0191481 A1* | 7/2013 | Prevost | H04L 51/14 |
| | | | 709/206 |
| 2014/0082098 A1* | 3/2014 | Collins | G06Q 10/109 |
| | | | 709/206 |
| 2014/0108562 A1 | 4/2014 | Panzer | |
| 2015/0199440 A1* | 7/2015 | Roeder | H04L 51/16 |
| | | | 707/692 |
| 2015/0348071 A1* | 12/2015 | Cochrane | G06F 16/958 |
| | | | 705/7.32 |
| 2016/0182414 A1* | 6/2016 | Mestanogullari | H04L 67/02 |
| | | | 709/206 |
| 2016/0216947 A1* | 7/2016 | Hassibi | G06F 3/04842 |
| 2017/0048170 A1* | 2/2017 | Smullen | H04L 67/306 |
| 2017/0279759 A1* | 9/2017 | Liden | H04L 12/1822 |
| 2018/0158081 A1* | 6/2018 | Li | G06Q 30/0203 |
| 2018/0176174 A1* | 6/2018 | Sherman | H04L 45/302 |

\* cited by examiner

METHOD AND SYSTEM TO CONVERSE ACROSS FRAGMENTED MESSAGING SERVICES BASED ON DISCUSSION TOPICS

CROSS REFERENCE TO OTHER APPLICATIONS

This application is continuation application and claims the benefit and priority to the U.S. application Ser. No. 16/007,889, filed on Jun. 13, 2018, which claims the benefit and priority to the U.S. Provisional Patent Application No. 62/519,572 entitled METHOD AND SYSTEM TO CONVERSE ACROSS FRAGMENTED MESSAGING SERVICES BASED ON DISCUSSION TOPICS filed Jun. 14, 2017, which are all incorporated herein by reference in their entirety.

BACKGROUND OF THE INVENTION

Various networks and conversational interfaces exist to facilitate communication between people. Examples of networks include cell phone networks and the Internet. Examples of conversational interfaces include instant messengers, text messaging, and web-based chat. Conversational interfaces can be used for trouble-shooting and addressing user concerns because users can interact with each other, and consumers can interact with companies. For example, a company can provide a consumer with several channels by which they can communicate with the company such as phone, instant messaging, text messaging, and web-based chat. A conversational interface can be effective in resolving complex tasks that involve multiple steps to complete. There are four common types of conversational interfaces: human-to-human conversation, human group conversation, human-to-machine conversation, and machine-assisted group conversation.

Typically, users prefer a face-to-face human-to-human conversation and human group conversation over the rest of the types of conversational interfaces. However, conventional messaging platforms have limited group conversation functions, and have a number of technical challenges. First, people use different messaging platforms, making it difficult to communicate across platforms in real time. Example messaging platforms include social messaging (Facebook® Messenger, WhatsApp®, Snapchat®, WeChat®, LINE, Telegram®, Skype®, Google+Hangouts®), company messaging (Slack®, Microsoft Teams™), and device messaging (SMS, RCS, iMessage®, BlackBerry Messenger®). A group chat can be initiated, but typically only within a single platform. Existing applications that support multiple platforms typically require a user to create an account, and is subject to an end user license agreement with the messaging platform, which sometimes does not allow third party applications. In addition, new messaging services develop and become popular over time. Conventionally, to incorporate the new messaging service in a third party messaging platform, each new messaging service manually added to the third party platform, which can be inefficient. Second, it can be difficult to find users with the same interests to invite them to a group conversation. Finally, it can be difficult to facilitate group conversation within a messaging/discussion board.

BRIEF DESCRIPTION OF THE DRAWINGS

Various embodiments of the invention are disclosed in the following detailed description and the accompanying drawings.

DETAILED DESCRIPTION

Figure 1:
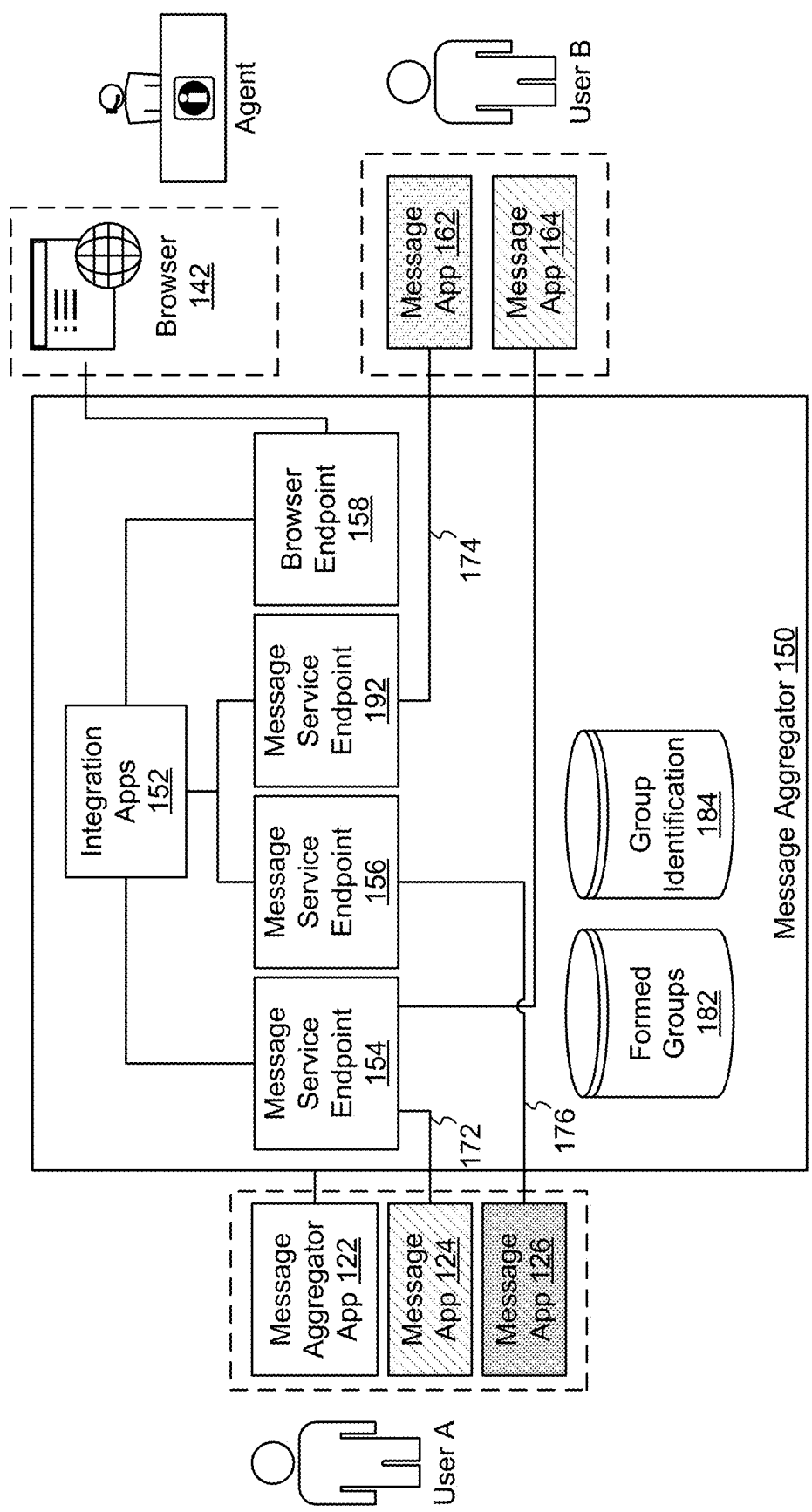
FIG. 1 is a block diagram illustrating an embodiment of a system for conversing across fragmented messaging services.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Conversing across fragmented messaging services is disclosed. Fragmented messaging services refer to a situation in which at least two users in a group of users use different messaging services. A messaging service is based on a messaging platform. For example, Facebook® Messenger is a messaging platform, and a first user may have an instance of Facebook® Messenger installed on her device while a second user may have an instance of Facebook® Messenger installed on his device. The messaging service can be text-based, video-based, audio-based or a combination. Although the examples below chiefly use text-based messaging service examples, the techniques described here can also be applied to video-based channels including smart speakers such as Amazon Echo® or Google Home™ where a user converse by voice while other users can converse by voice or written messaging. When two uses use different types of messaging services, then the messaging services are fragmented. Because the platforms are different from each other, they are typically incompatible and unable to send messages to each other. In this disclosure, various embodiments of group chat and discussion across different messaging platforms are described. A message aggregator is configured to receive and send messaging between group members, where the group members may be using different messaging platforms.

In one aspect, a group can be easily created (e.g., by a single click of a group creation button). The group can have one or more associated topics. Group members such as customers, support agents, and integration applications (apps) can interact across different messaging platforms. In some cases, a group can be automatically created with unique information without requiring additional input from the user. For example, when a customer and support agent complete a transaction (e.g., purchase a product/service, exchanges an email), the group is created or the customer is added to the group. This effect of the transaction (joining/creating the group) can be defined by an administrator. For example, the administrator can create a rule to define what happens in response to customer interaction with other users or a support agent.

In another aspect, a group member can switch between messaging platforms or use multiple messaging platforms. The group member's identity is supported across different messaging services by associating each of the different services with the same group member. For example, a user joins a conversation from a customer support web site using her desktop. Suppose the user then leaves the desktop because she is catching a bus. The user can continue the conversation on her mobile device using text messaging. The conversation includes a history of the discussion that began on the customer support website, allowing the user to easily keep track of the conversation across different types of messaging apps or devices.

In another aspect, functions unique to a first messaging platform are provided to a second messaging platform. For example, a message aggregator can format stickers (such as emoji, gif) and other features unique to the first messaging platform into a format recognizable by the second messaging platform. That is, messaging platform specific stickers can be converted to a common format (e.g., jpg) to deliver to other messaging platforms if similar stickers are not available on the other messaging platforms.

In yet another aspect, the message aggregator is configured to deliver content related to the group based on the conversation between the group members. Content services and applications may be provided to facilitate the cross-platform conversations. For example, group interests can be learned from the conversation. Suppose group members are discussing mutual availability for a party. The service app can detect that this type of conversation is taking place, and automatically provide a group poll on possible dates to help with decision making between group members.

FIG. 1 is a block diagram illustrating an embodiment of a system for conversing across fragmented messaging services. Here, the messaging services are fragmented because there are several platforms used by Users A, B, and the agent. Platforms that are the same have the same shading. Here, Message App 124 and 126 are the same platform, but the other Message Apps are different platforms. The system includes a message aggregator 150 that supports a variety of content types and messaging platforms. Here, the message aggregator facilitates communications between three users, User A (120), User B (160), and Agent (140).

Message aggregator 150 is configured to receive a message from one user and route the message to another user. Each of the users may use one or more message apps or browsers installed on one or more devices. User A uses Message Aggregator App 122, Message App 124, and Message App 126; User B uses Message App 162 and Message App 164; and the agent uses Browser 142. Message Aggregator App 122 is not required for users in the system to converse across fragmented platforms. Message Aggregator App 122, like Browser 142, is but another example of a messaging platform that provides an interface for the user to communicate with other users. Each user may have a preferred messaging app, which is determined based on usage pattern or at the user's designation, e.g., the app that the user uses most frequently. In this example, User A's preferred messaging app is 124.

Message aggregator 150 includes one or more integration apps 152, one or more message/browser service endpoints (here, 154, 156, and 158), and group data storage 172 and text, media, location and contacts storage 174. In various embodiments, the message aggregator is a server, e.g., a web server that supports REST API, configured to receive messages via a communications network.

Service endpoints 154, 156, and 158 interface between Message Aggregator 150 and user apps 124, 126, 142, 162, 164. The endpoint can be implemented by an API. For example, the endpoint can be a web hook (web server) that understands messaging platform protocols (e.g., Facebook® message protocol, Twilio® SMS inbound web hook, etc.), SMTP email inbound, web browser push notification interface, or websocket for a message aggregator app. In various embodiments, a service endpoint is configured to handle communications from a respective type of app. For example, Message Service Endpoint 154 services Message Apps 124 and 164 because 124 and 164 are the same type of message app (e.g., both are Facebook® Messenger apps). Message Apps 126 and 162 are different types of message apps; thus, Message Service Endpoint 156 services Message App 126 and Message Service Endpoint 192 services Message App 162. Browser Endpoint 158 services Browser 142. For example, JavaScript can be embedded in browser 142 as a browser add-on or Website add-on. Browser 142 communicates with Browser Endpoint 158 by serving JavaScript. In some embodiments, a REST API call connects Browser 142 with Browser Endpoint 158 directly.

Message apps 124, 126, 162, 164 may be one of several types of available third party messaging apps such as Facebook® Messenger, iMessage®, WhatsApp® and the like. In the example shown here, messaging apps of the same type are shaded with the same pattern. Here, Message App 124 and 164 are the same type, and thus share the same Message Service Endpoint 154. Message App 162 is a different type of messaging app and has its respective Message Service Endpoint 192. Message App 126 is yet another type of messaging app and has its respective Message Service Endpoint 154.

A user may have one or more devices on which the apps or browsers operate. For example, all of the apps shown may be installed on a single device, or, referring to User B, User B may have Message App 162 installed on a first device, and Message App 164 installed on a second device. For simplicity, devices associated with a user are not shown.

The agent can simply be another user. Here, this user is called an "agent" to illustrate a use case in which customer users, User A and User B, can chat with a representative of a company, Agent 140. The agent uses a Web browser 142, which interfaces with browser endpoint 158 to communicate with User A and User B. Even though User A and User B may be using messaging platforms different from the browser, the Agent is still able to communicate with the other users because Message Aggregator 150 intercepts the message and formats them for User A and User B as further described below.

In some embodiments, User A, User B, Integration Apps 152, and Agent together form a group. A group can help make customer support more effective, especially if there are group actions and decisions to be made. For example, a user may invite another user to form a group. A discussion group may be formed to discuss a topic. A planning group may be formed to plan a trip, etc. Message aggregator 150 is configured to generate a group identification message, which is an invitation to join a group. For example, a user requests the message aggregator to generate an invitation that can be posted to social media or a Web site. In response, the message aggregator generates an invitation. The invitation can be created in various formats including, without limitation, URL (short or long) and QR code. In some embodiments, the invitation is converted to an appropriate platform-specific code such as a Facebook® parametric to allow a Facebook® user to directly join the group from Facebook® Messenger. Group formation is further described below with respect to FIGS. 4 and 5.

Formed Groups 182 stores information associated with groups that have been created. For example, group membership (e.g., users belonging to the group), activities, changes/history may be stored for each group.

Figure 6:
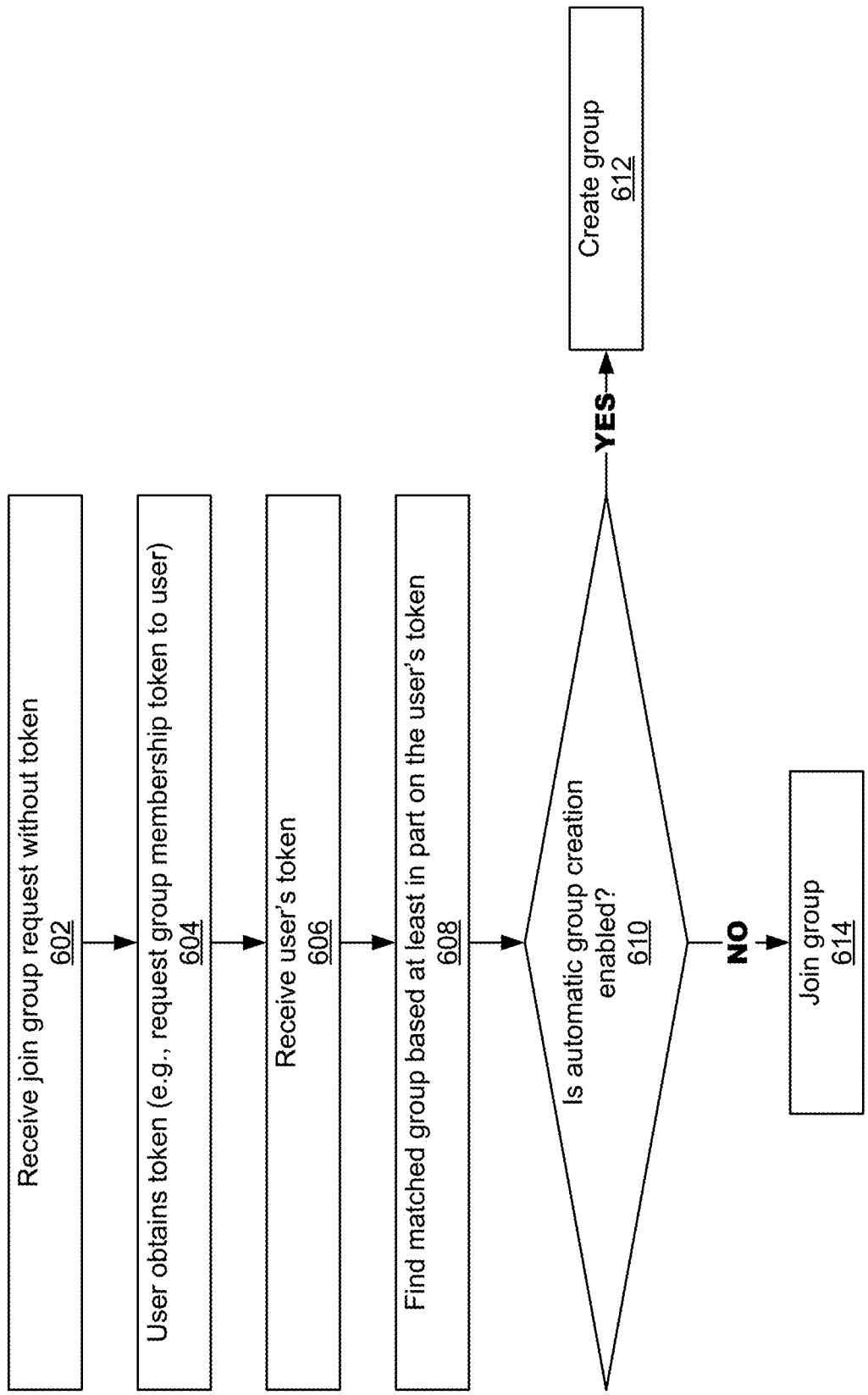
FIG. 6 is a flow chart illustrating an embodiment of a process for joining a group, where members of the group can converse across fragmented messaging platforms.

Group Identification 184 stores information that can help identify a group. For example, a user is looking to join a group and sends identification to Message Aggregator 150. Message Aggregator 150 can look up the information provided by the user to find a matching group. Examples of group identification include text, media, location, contacts, etc. An example of a process to find a group is shown in FIG. 6.

In operation, Message Aggregator 150 (a single interface) creates a group (such as a discussion or chat group) across messaging platforms. This allows User A to message User B without requiring User B to install the same messaging platform that User A is using. This makes it both more convenient and faster for User A and User B to communicate, while each user uses their preferred messaging app.

Integration apps 152 provide common services to users such as user identity management and an administrative user interface. Integration apps are sometimes called automation apps, because they can automatically provide support to users. Message Aggregator 150 may include a variety of integration apps to carry out a variety of functions. For example, an integration app can be configured to integrate with third party or external services such as storage like Dropbox® or Box®, commenting service such as Disqus®, business support service such as Zendesk®, Salesforce®, etc. The integration app can integrate with third party or external services by using APIs provided by those services.

Figure 13:
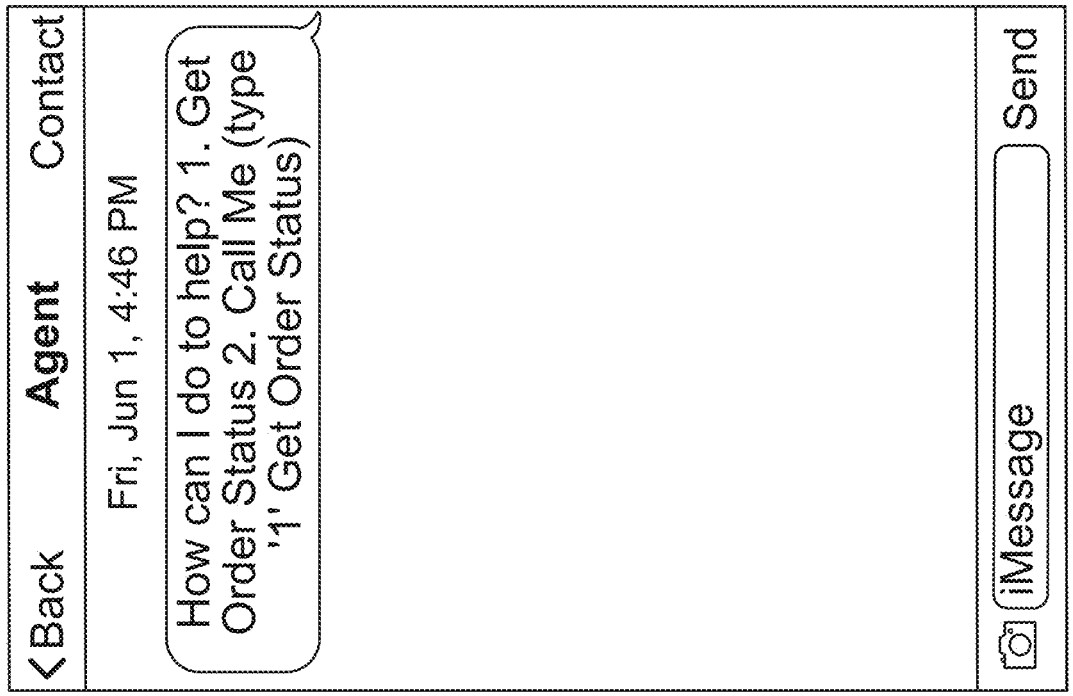
FIG. 13 shows an example of a feature in the messaging platform of FIG. 12 that has been converted for a second messaging platform.
Figure 12:
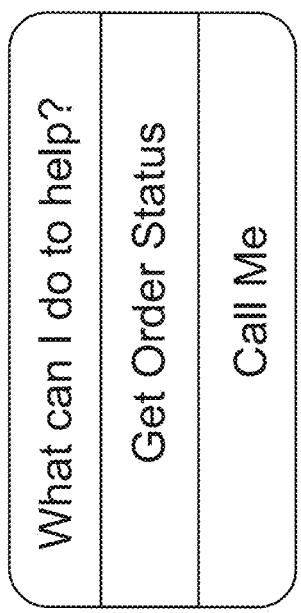
FIG. 12 shows an example of a feature in a first messaging platform.

Integration Apps 152 can provide a variety of services to the group. In some embodiments, an integration app implements a posting service to each messaging platform. For example, a group administrator decides to publish a discussion (or group chat) to a Facebook® group. An integration app can help with the publication by formatting the content to be compatible or optimized for the Facebook® group. For example, the integration app can use APIs provided by the messaging services to format content. FIG. 12 shows an example of a feature in a first messaging platform. The GUI shown in FIG. 12 has buttons, and the messaging platform (Facebook Messenger® here) has a way to display the buttons to allow users to get an order status or receive a call. However, other messaging platforms might not have a way to display these GUI elements. For example, in SMS graphical buttons are typically not supported. FIG. 13 shows an example of a feature in the messaging platform of FIG. 12 that has been converted for a second messaging platform. Integration App 152 has converted the content corresponding to FIG. 12 to a text-based format as shown in FIG. 13 allowing a user to get an order status by replying with a text "1" or received a call by replying with a text "2."

As another example, the group administrator wants to post the discussion (or group chat) to a website owned or shared between group members instead of only keeping the conversation on the messaging platform. An integration app can automatically post the discussion to the website by making a REST API call, formatting the discussion text as an HTML and uploading to a web server, etc.

For both examples described above, an individual user has the ability to choose whether their message will be posted to a public (e.g., Facebook®) group or website. In some embodiments, even if a user allows comments to be posted to a public group or website, comments can be posted anonymously at the channel-level to protect a user's identity.

In some embodiments, an integration app is configured to provide notifications to users of online communities, such as an online course. Members of an online discussion group such as a class discussion board or an assignment uploading platform receives posts through their preferred messaging platform. Each member can interact with the online discussion group using their preferred messaging platform without needing to create a new account for the class discussion board. Interactions include, without limitation, commenting, rating, editing, and using available online forum functions. In other words, students may use different messaging platforms, and the integration app will intercept these messages and format them to the appropriate messaging formats of the recipients or other members of the group. This allows a student to contribute to the discussion using a messaging platform they are accustomed to. For example, a teacher receives assignments on an online platform, and the integration app notifies the teacher through his preferred messaging platform. For example, the teacher receives a calendar invitation with the student's assignment as an attached file in Microsoft Outlook®. Through his preferred messaging platform, the teacher can comment and grade the assignments without needing to use the class discussion board website.

In some embodiments, an integration app suggests content for publishing to a group, and the suggested content can be reviewed by a group administrator or other group member. In one aspect, the automatic content suggestion can help keep a community engaged. For example, based on the content of a group's discussion, the integration app selects recommended content. Before publishing the recommended content, in various embodiments, the content is provided to a moderator, administrator, or other user for review. The reviewer can choose whether to publish that content or not, and can edit or select portions of the content for publishing. For example, if User A posted news about "changes of patent law" to a patent discussion group and the integration app detects news related to patent legislation or cases, the integration app can recommend the news to User A. This way, the message aggregator can engage User A while inviting other users to come back to the channel to read the news. In some embodiments, a service provider can promote products by injecting content into the discussion. An integration app can use the group chat discussions or group's content engagement to choose a most appealing promotion.

In some embodiments, an integration app is configured to provide cross-group content promotion. For example, when a first group has lot of discussion (e.g., posts exceeding a threshold) around a topic, "changes of patent law" by User A, the integration app may ask the group (e.g., User A) for redistribution rights to distribute the information to a second group who is interested in the topic or related topics. This recommendation promotes the groups to each other by making them aware of their mutual interest in "changes of patent law." Another example of integration apps is described after FIG. 8 using the scenario of a renting a car.

In some embodiments, an integration app is configured to provide services not native to a user's messaging platform. For example, the integration app can provide its own voice-to-text service to group users. Suppose a device transcribing service (text-to-voice service (e.g. Siri®)) only works on certain types of messaging platforms and not on other messaging platforms. For example, a device may try to transcribe the text from the whole screen when user wants to listen to each message only. The integration app can solve this problem by performing the transcription and providing text-to-voice content if the user prefers to receive a message as audio instead of text. This way, the user does not need to wait until a device transcribing feature is implemented for her preferred messaging app. Messaging apps sometimes have platform-specific stickers that work only within the messaging platforms. To integrate platform-specific stickers, in various embodiments, a service endpoint fetches a platform-specific sticker in image format to transfer to other messaging platforms.

In some embodiments, an integration app keeps track of user contributions to a group discussion. For example, the integration app assigns and maintains a user's sharing score or engagement score, which can be publicly displayed, and may improve a user's engagement by motivating him to increase his score.

In some embodiments, an integration app is configured to provide content to a shared file service such as Dropbox®, Box®, SkyDrive®. The content uploaded to the shared file service can be accessed by a user such as a group administrator for review and sharing with the group. For example, group administrators can share data with businesses for a common project (e.g. home improvement). Suppose a homeowner starts an online group to work with a painting contractor and shares home photos with the painting contractor. While painting, the painter notices that a wall should be fixed. The home owner can then add a handyman, arrange a fix date, and share the information such as a photo of the wall to be fixed. Each user can configure where their attachment files are to be exported to automate the file-sharing process instead of manually forwarding the files to the destination. In some embodiments, when a new file is posted to the shared file service, the group is notified. In various embodiments, a file can be copied to a message aggregator (such as message aggregator 150 of FIG. 1) to serve to group members. An original file location is used, in various embodiments, to allow access control to the file.

In some embodiments, an integration app is configured to service an email gateway application. The email gateway application receives an email message, and can post the email to the group. For example, if a group is related to the real estate market, the group can collectively subscribe to a real estate news provider using the group's email address (e.g. group1@abc.co). When the real estate news provider sends a message to the group's email address, the message will be delivered to individual group members in a message format preferred by the each individual member. Depending on group preference, the integration app can be configured to handle inbound emails to the group or distribute emails to external parties on behalf of the group. If an email contains an attachment, the attachment may be provided as a link in the format of the messaging channel preferred by a recipient user. In some embodiments, the attachment may be sent directly instead of as a link. In various embodiments, a user can respond to inbound emails by messaging. A response to the inbound email can be composed by the user in her preferred messaging app, formatted as an email by the integration app, and sent as an email.

Message Aggregator can be implemented by a hardware device or software device, such as ASIC or the like. In one aspect, the message aggregator improves the functioning of a computer network by more efficiently routing messages between devices. In another aspect, the message aggregator improves the technical field of telecommunications by delivering content between devices, messaging platforms, and apps that are not otherwise compatible.

The system shown in FIG. 1 may include additional optional components (not shown here) to help with group identification or formation. In some embodiments, a discovery engine connects users with possible interests, social media, commenting services, and automation apps. For example, the discovery engine consults third party directories such as Facebook business directory or Apple iMessage® business directory to connect users to businesses based on user activity and demonstrated interests. The discovery engine can be used to find a group corresponding to an invitation that brought the user in the first place. Groups can be found based on an URL, QR code, Browser add-on, text, and media. In some embodiments, users, services, and groups can be discovered via directories. Directories may be established by messaging platforms such as Facebook® business directory or iMessage® business directory. A user can find a business name using these directories.

The number and types of users shown here is merely exemplary and is not intended to be limiting. Members of the group are able to communicate with each other without needing to use the same messaging platform. FIGS. 3A-3D show examples of a group and changes in membership over time.

An example process of conversing across fragmented messaging services based on discussion topics will now be discussed with reference to the system shown in FIG. 1

Figure 2:
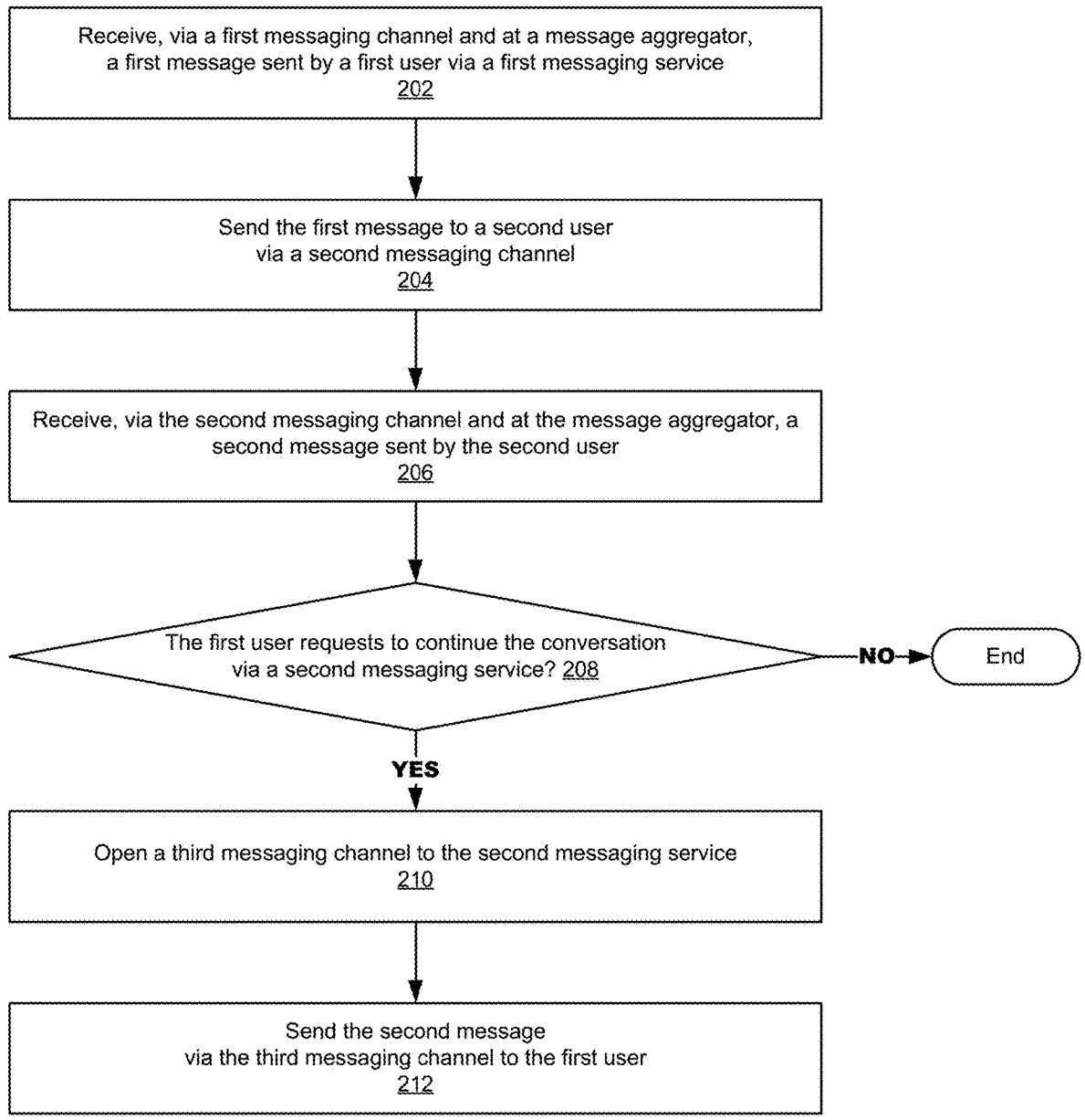
FIG. 2 is a flow chart illustrating a process for conversing across fragmented messaging services.

FIG. 2 is a flow chart illustrating a process for conversing across fragmented messaging services. The process can be implemented by a message aggregator such as the one shown in FIG. 1.

At 202, a first message is received via a first messaging channel at a message aggregator. The first message is sent by a first user to a second user via a first messaging service (e.g., Message App 124 of FIG. 1). Referring to FIG. 1, User A sends the first message using Message App 124. Message Aggregator 150 receives the message at Message Service Endpoint 154. The channel on which the message is delivered is channel 172. The channel is a communication pathway on which a message is delivered from a sender to a recipient.

Returning to FIG. 2, at 204, the first message is sent to a second user via a second messaging channel. Referring to FIG. 1, the first message is delivered to User B via channel 174. As more fully described with respect to FIG. 1, the messaging apps used by User A and User B are not necessarily the same. In this example, Message App 124 is implemented to operate on a different messaging platform from Message App 162. Nevertheless, the message is seamlessly routed by Message Aggregator 150 between the users using channel 172 and channel 174 because the Message Aggregator 150 formats the message for the recipient's preferred messaging app.

Returning to FIG. 2, at 206, a second message is received via a second messaging channel at the message aggregator. The second message is sent by the second user via a second messaging service. Referring to FIG. 1, User B sends the second message using Message App 162. Message Aggregator 150 receives the message at Message Service Endpoint 192. The channel on which the message is delivered is channel 174. Suppose that before the second message is delivered to User A, User A requests to use Message App 126 to continue the conversation (instead of Message App 124).

Returning to FIG. 2, at 208, it is determined that the first user requests to continue the conversation via a second messaging service. The second messaging service is different from the first messaging service. For example, the first user can use the first messaging service to send a request to the message aggregator to continue the conversation using a different messaging service, as further described with respect to FIG. 5. Referring to FIG. 1, User A, who originally used Message App 124 to send the first message, requests to continue the conversation using Message App 126 instead.

Returning to FIG. 2, at 210, a third messaging channel to the second messaging service is opened in response to a determination that the first user requested to continue the conversation via a second messaging service. Otherwise, if the first user did not make such a request, the process terminates. The third messaging channel is associated with the first user's account on the second messaging service. Referring to FIG. 1, channel 176 is opened if User A requests to continue the conversation using Message App 126 (instead of using Message App 124). Channel 176 is associated with User A's account on Message App 124. An example of associating different accounts of the same user (also called "merging messaging channels") is further described with respect to FIG. 8.

Returning to FIG. 2, at 212, the second message is delivered via the third messaging channel to the first user. Referring to FIG. 1, the second message, which was sent by User B using Message App 162 on channel 174, is delivered via channel 176 to Message App 126. User A is able to view the message on Message App 126. At least a portion of the history of messages between User A and User B, in various embodiments, is available on Message App 126 although the app is being used for the group discussion for the first time. The message history is made available on Message App 126 when the user requests to continue the conversation on Message App 126. This allows a single user to continue a conversation using different devices or messaging apps with a group of users.

In various embodiments, the second messaging channel is a private messaging channel. A private messaging channel allows designated members of a group to send messages to each other without sending them to other members of the group. An example of private messaging is further described with respect to FIG. 3D.

In various embodiments, the first user and the second user together form a conversation group. Conversation groups can be formed around discussion topics such as common interests, shared experiences, common goals, and the like.

In some embodiments, users may form a group to promote a brand, a product, or topics selected by the users. In such cases, the users may invite a vendor to run a promotion to their chat group, in which the vendor can distribute discount coupons or stickers. Some messaging platforms support payments, and a discount sale can be carried out by using the message platform's payment mechanism.

In some embodiments, a user (such as User B of FIG. 1) represents a group in a messaging platform. For example, a user might have a SMS text group that is supported by phone, and joins that group. This allows multiple users to see the group discussion. In this case, the group chat is unlisted but the public can access the group in the sense that SMS texts to group members from the public are allowed. In some embodiments, a SMS recipients list can be used to detect whether a user requesting access is allowed to join. For example, users who are not on a participants list (list of phone numbers) cannot participate because they do not have permission. The group decides whether to allow or deny that recipient access to group. In some embodiments, a user might add the group chat service from a message aggregator to messaging platform provided group chat by adding the messaging platform endpoint to their messaging platform's group member. In that case, the messaging platform endpoint detects the group members and previous history that is accessible from the messaging platform to build a group member list, and group discussion history. For example, a Facebook® group for an extended family can add a travel agent group from the message aggregator to the group.

Members of the group can converse using different messaging platforms, and, in this sense, can converse across fragmented messaging services. The following figures show examples of how a conversation group is formed and changes to group composition.

Figure 3A:
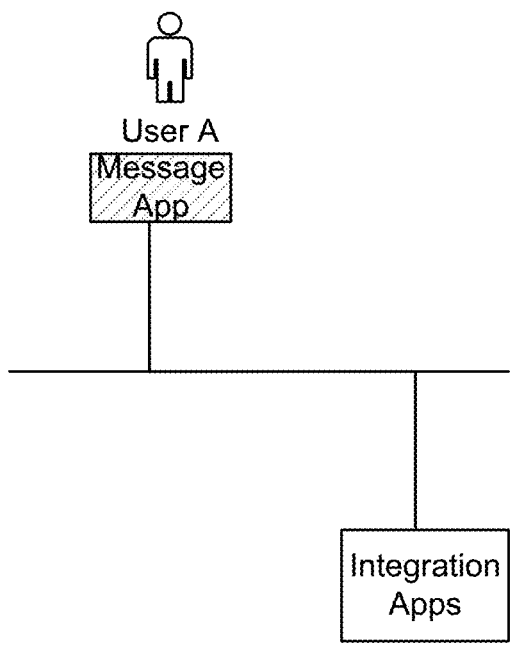
FIG. 3A shows a first state of a group.

FIG. 3A shows a first state of a group. Members of the group are able to converse across fragmented messaging services. In this state, the group has been created, and includes User A and integration apps. A group can be automatically created when User A initiates a conversation with an integration app (e.g., by sending a message to the integration app using a preferred message app). Group creation can either take place in the background without explicit instructions from User A or can happen in response to a request by User A. For example, an administrator can define a rule or configuration so that the group is created in response to rule conditions being satisfied without requiring user action. One rule may that after a product is delivered to a customer, a group conversation is automatically initiated between the customer and a support agent to help the customer install the product. Another rule may be automatically sending a quarterly note to a customer based on a list of users maintained by an administrator.

In some embodiments, the originating group member(s) are automatically administrators and have enhanced abilities compared with other users. Administrator group members can designate other group members to be administrators. In some embodiments, a group is assigned an identifier and group activity such as conversations, membership changes, and preferences are stored in associated with the identifier. Referring to FIG. 1, group data is stored in Formed Groups database 182.

An example of User A is User A of FIG. 1, and an example of integration apps is integration apps 152 of FIG. 1. Like the example of FIG. 1, User A is shown with an associated preferred messaging app. User A is able to avail the services of the integration apps such as receiving an automated survey regarding an experience of using a web service, via her preferred messaging app. The composition of a group may change, for example, depending on actions of a group administrator or member.

Figure 3B:
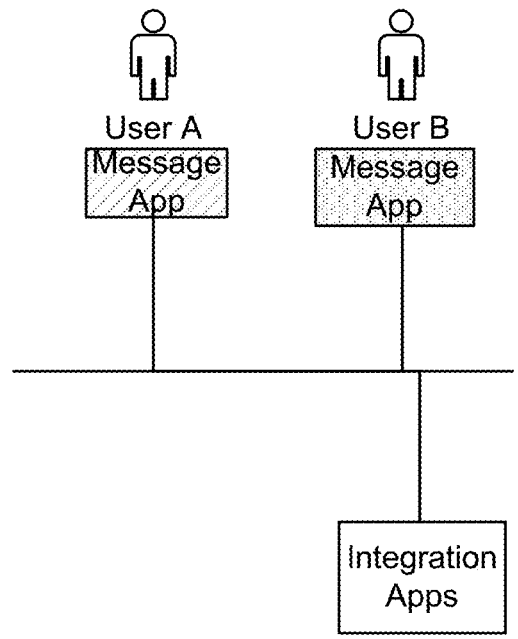
FIG. 3B shows a second state of a group corresponding to the one shown in FIG. 3A.

FIG. 3B shows a second state of a group corresponding to the one shown in FIG. 3A. In this state, User B has joined the group, and the group includes User A, User B, and integration apps. User B can join the group in a variety of ways. One way User B joins the group is at the invitation of User A. For example, a message aggregator like the one shown in FIG. 1, receives a request from User A to invite User B. For example, User A can make the request by inputting User B's contact information in a GUI like the one shown in FIG. 9. The message aggregator creates a group identification message (such as an URL, QR code, and the like) to be sent to User B. User B uses the group identification message to accept the invitation. When the message aggregator receives an acceptance from User B, the message aggregator adds User B to the group, storing User B's identity in association with the group. Examples of invitations are further described with respect to FIGS. 4-6. As groups grow in size, existing members can add new members. For example, after User B has joined the group, a third user can be invited to join using the same process described above for User B. The group identification message can be sent by either User A or User B to the third user to invite that user to join the group. In some embodiments, an external support agent or third party app who has access or integration with the message aggregator service but is not necessarily part of the group can add users to a group or join the group. Another way User B joins the group is via a link, which can be obtained on a social media platform, by scanning a barcode at a physical location where the barcode is posted, and the like.

Each of the group members is able to communicate with others regardless of messaging platform. This ability to communicate is represented by the communication bus: each of the devices (associated with a user) is coupled to the bus. Each of the group members are like the ones described with respect to FIG. 3A. An example of User B is User B of FIG. 1. Like the example of FIG. 1, User B is shown with an associated preferred messaging app. To illustrate the ability of User A and User B to communicate regardless of messaging platform, User B uses a different type of messaging app compared with User A as represented by the different hatching of the message apps. Message apps of the same type have the same hatching.

Figure 3C:
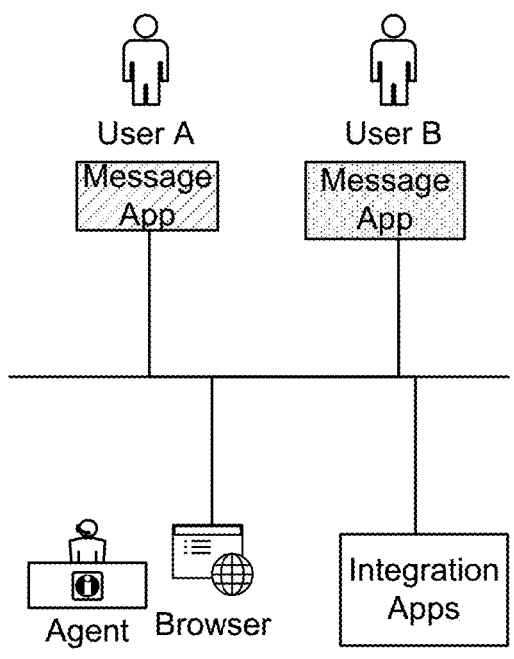
FIG. 3C shows a third state of a group corresponding to the one shown in FIG. 3A.

FIG. 3C shows a third state of a group corresponding to the one shown in FIG. 3A. In this state, an agent has joined the group, and the group includes User A, User B, the agent, and integration apps. For example, a group member (here, User A or User B) has invited an agent to join the group. In some embodiments, an integration app may recommend that an agent be invited to join the group when it detects that the group would benefit from agent assistance. For example, the integration app can detect that the group needs agent assistance based on a conversation that the group is having. If members are trying to find out a good airfare for a trip, the integration app can suggest an agent to help book flight tickets. In some embodiments, an agent can request to join the group. Each of the group members are like the ones described with respect to FIG. 3B. An example of the agent is the agent of FIG. 1. Like the example of FIG. 1, the agent is shown with an associated preferred messaging app (here, a Web browser), which the agent accesses using one or more of her devices.

Although only one agent is shown here, it is possible for multiple agents to join the group to support requests. For example, one agent helps with flight booking, while another agent helps with hotel booking.

Figure 3D:
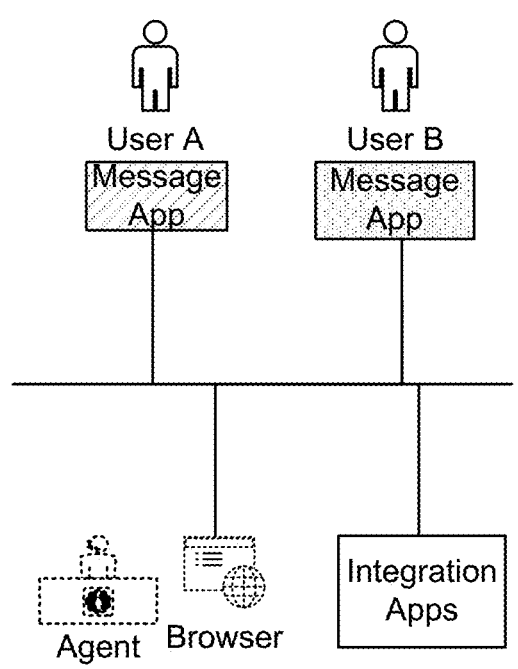
FIG. 3D is shows a fourth state of a group corresponding to the one shown in FIG. 3A.

FIG. 3D is shows a fourth state of a group corresponding to the one shown in FIG. 3A. Here, Users A and B may wish to discuss a private matter and exclude other group members from this conversation. Private matters can discussed by entering a private mode. In this state, User A and User B are in a private mode. In a private messaging mode, two or more users converse with each other, while excluding other members of the group. For example, group members who are not part of the private discussion do not receive messages. Here, User A and User B have a private discussion without the agent. This is represented by showing the agent in dashed lines. The agent remains in the group, but is not privy to the conversation between User A and User B while Users A and B are in a private messaging mode. For example, a chat transcript between all three members would not show conversations between Users A and B while they are in the private mode. In some embodiments, even while they are having the private conversation, the agent can send messages to the group. The type of conversations that occur in private mode is configurable. For example, User A and B do not want to be disturbed by support agents in private mode, they can defer messages or prevent messages from the support agent. However, if the agent leaves the group, messages sent by the agent will not be received by group members. In some embodiments, if an agent wants to message the group, the agent can request to join (or re-join) the group.

In various embodiments, a group member has the option to exit the group. Any user may decide to mute the group or leave the group. Opt-in and opt-out of a group can be configured by an administrator to comply with various rules and regulations. In some embodiments, when a user leaves or exits a group, the user is added to an opt-out list such that message to the group are not delivered to the user. Suppose the user later re-joins the group. The user will then be removed from the opt-out list. Opt-out can be implemented in a variety of ways. One way to opt-out is by in-channel detection. For example, when a user types "stop" or gives another command via a messaging service, the wish to opt-out is detected. As another example, a third party system can provide the opt-out list. A user on the opt-out list will not receive group messages unless the user chooses to opt-in, e.g., by clicking an email or website link.

In some embodiments, "mute group" is different from an opt-out. When a user mutes a group, messaging are held and not delivered to the user. When the user un-mutes the group, new messages are delivered to the user. The old messages that were help while the group was muted can be viewed by the user by the user requesting a history. In some embodiments, upon un-muting the group, the user receives a message counters showing a number or preview of those messages from the muted period. In some embodiments, in a muted mode, a user does not receive messages but instead receives a counter or notification of messages.

Figure 4:
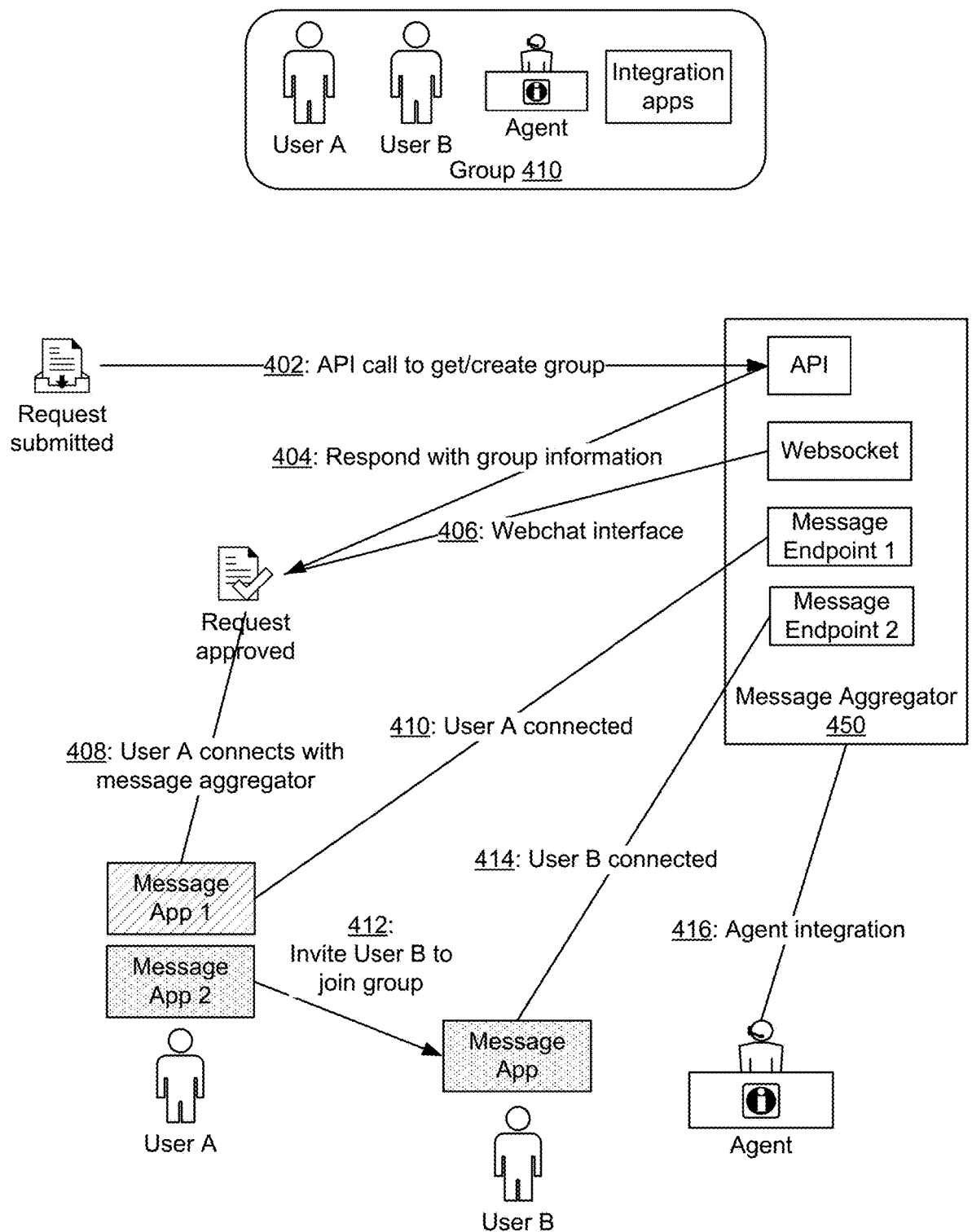
FIG. 4 is a block diagram illustrating an embodiment of a process for creating a group to converse across fragmented messaging services.
Figure 5:
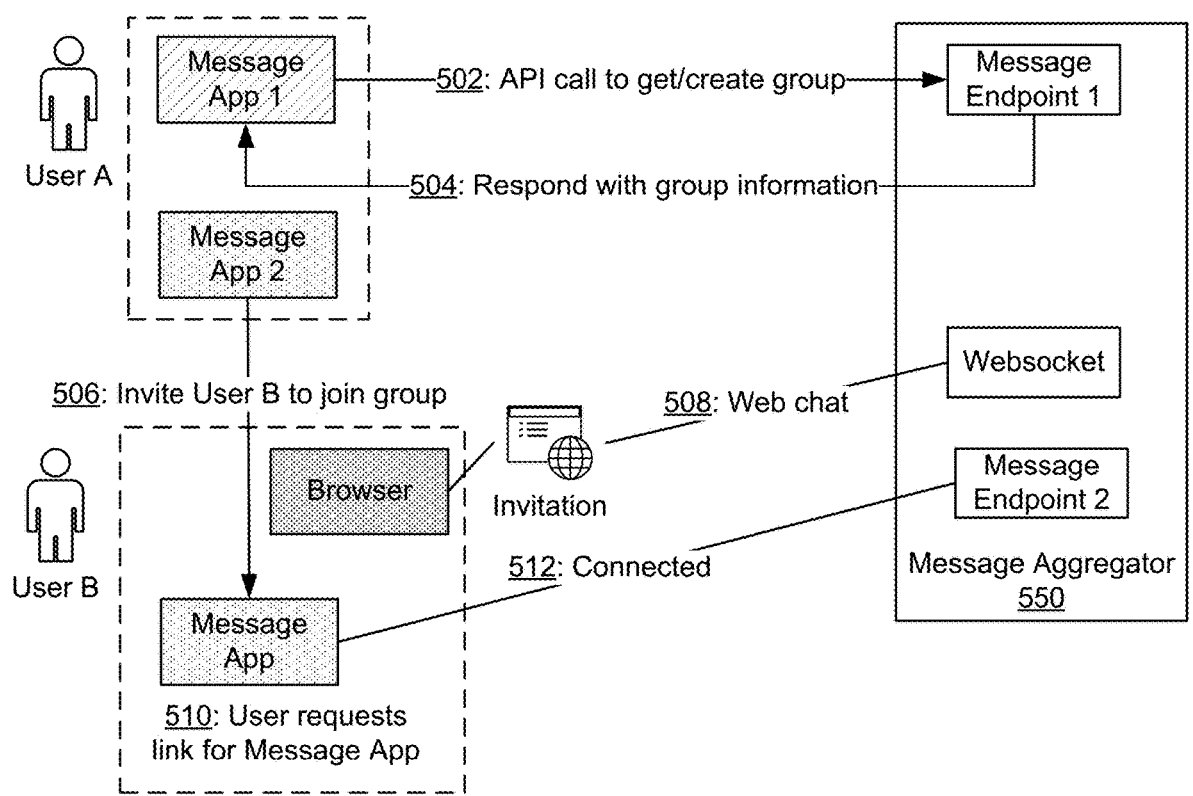
FIG. 5 is a block diagram illustrating an embodiment of a process for creating a group to converse across fragmented messaging services.

The following figures show examples of how a group is formed. FIG. 4 shows an example of an API-initiated group. FIG. 5 shows an example of a messaging-initiated group.

FIG. 4 is a block diagram illustrating an embodiment of a process for creating a group to converse across fragmented messaging services. The process shown here illustrates how Group 410, including User A, User B, Agent, and Integration Apps, is formed. The process shown here also corresponds to the system shown in FIG. 1. Each of the components function like their counterparts in FIG. 1 unless otherwise described.

This example is called an "API-initiated group," because the group is initiated by an API call 402. As shown in the top left, User A submits a request. For example, User A accesses an order page (e.g., a travel booking page), and clicks an order submit button, which initiates an order process and an API call to get or create group (402). The request triggers an API call (such as a REST API) to message aggregator 450.

Depending on whether a group already exists, the API causes a group to be found or created. In various embodiments, the API call is to get a group. For example, a group has already been created, and the submitted request causes a lookup of a group. Suppose a group of users is planning a trip. When User A submits the travel booking order as part of the trip planning process, the associated group is looked up in order to connect this travel booking request with the group. For example, an identifier associated with User A is looked up in Formed Groups 182 of FIG. 1.

If a group does not already exist, then the group is created. This may be because User A is taking the first step in a travel planning process. The travel booking order causes a group to be created such that subsequent requests and actions are associated with the group. In some embodiments, a create group function takes a group name and an API token to distinguish from other groups. In some embodiments, a create group API command can be formed with image, audio, video, or location tags. This allows a user to create a group with information not necessarily restricted to text, which information other users can also use to join the group. For example, if a group administrator creates a group with a photo, the group can be identified by the photo (e.g., the photo's object detection) or metadata associated with the photo (e.g., a location tag, camera model of camera that took the photo). For example, if a user wants to create groups with the same camera model, the user can use meta tags of a camera model to identify the group.

At 404, Message Aggregator 450 responds with group information. The response to "create group API" includes group access information such as a URL, QR code, and/or other information to access the group depending on different messaging channels (404). For example, Facebook® Messenger may be accessed from a m.me link or parametric code, while SMS can be accessed by a SMS link URL (e.g. sms:4011112441?body=joingroup1). The response may be tailored to the OS type of the requesting device. The group information may include a confirmation that a group has been looked up or created. Group information such as an identifier allows User A and the submitted request to become associated with the group. The response may contain URLs of messaging groups and information. In some embodiments, the response also indicates that the request has been approved. This may be signaled to User A by a message displayed on the Web site such as a thank you to User A for her order. User A may also be invited to connect with the Message Aggregator 450 and other group members (if any).

The response can be provided in one or more of a variety of locations. For example, the destination of the response can be specified by a setting from a web site service. By way of non-limiting example, the response can be served on a website or in an email. Using the example of a travel booking order, the response is served on a website by displaying order confirmation and group details on the Web page where the user placed the order. In various embodiments, the response is served in an email by emailing User A a confirmation of the order with group details. This response can be provided via a websocket associated with message aggregator 450 (406). The invitation to connect can include one or more platform-specific links. In some embodiments, at 406, the web page can serve a web chat service that connects to Message Aggregator 450.

In some embodiments, a user can choose to receive messages on multiple channels. For example, a most common messaging channel (e.g., SMS) can be used to send a push notification to a user, while web chat components provide additional interaction features. For example, the message aggregator transitions between a messaging channel and a web chat depending on whether web chat is active or not. If the web chat is active, the web chat is used to send new messages to the group, but if the web chat is offline (e.g. websocket disconnected), SMS is used as the notification channel.

At 408, User A responds to the invitation to connect with Message Aggregator 450. User A can continue the conversation that began with the request submission (402) on the same or different messaging platform. If User A responds to the invitation using a different messaging platform, the transition is seamless. For example, User A clicks a link rendered in a GUI of her preferred messaging app (here, Message App 1), which is different from the initial request submission via a web browser. In response, User A becomes connected to Message Aggregator 450 (410) via the preferred messaging app. User A is now a member of the group, and can invite other Users to join the group.

Although not shown in this example, another way for the user to be added to the group is by a support agent. The user does not need to explicitly choose to talk to another user or join the group, but instead may be connected by integration apps. For example, if the integration app detects that User A is unable to choose a product, then integration app connects the user to the group and agent to help the user.

In this example, at 408, User A clicks on a Facebook® Messenger link, and starts Facebook® Messenger. In some cases, intermediate pages are used to detect whether the Facebook® messenger app was installed on the user's device before launching Facebook® messenger. If the app is not installed, then the user can be forwarded to a web version of the app or forwarded to a download link for the app. Message aggregator 450 can respond with group information to User A. The form in which the information is delivered can be as a Web page, email, SMS, or other delivery method, which may be pre-configured according to User A's preference. As an example, if the response is delivered via a Web page, User A may access messaging using a web chat interface.

User A can invite other users to join the group using email, SMS, or other method. In some embodiments, User A invites other users by posting a QR code to a physical location such as at an event venue or on a product. For example, a QR code posted on a bicycle can be used to create a group of bicycle users. Other users can scan the QR code to find the group and request to join the group.

At 410, Message App 1 connects to Message aggregator 450 via Message Endpoint 1. As more fully described with response to FIG. 1, the message endpoint integrates Message Aggregator 450 with a corresponding message platform.

At 412, User A invites User B to join the group. In this example, User A invites User B using a second messaging app, Message App 2. For example, a link is sent to User B at the messaging app associated with the contact information provided by User A. This messaging app can be different from the one used by User A. When User B clicks this link or replies to the message, he becomes connected to Message Aggregator 450 (414). In some embodiments, Message Aggregator 450 can send additional information to User B about how to access the message aggregator using other message platforms or Web chat. In some embodiments, when User B clicks the invitation link, a Web page is launched and User B is connected to message aggregator 450 via web chat.

In some embodiments, the invitation is generated by Message Aggregator 450, and sent to User A when User A requests the invitation information. User A can send User B the invitation to join the group in a variety of ways. For example, User A can click a link from her preferred Messaging App 1, or User A can copy and paste the invitation message from Messaging App 1.

Agents, who are users that facilitate group actions, can also be integrated into the group. For example, at 416, an agent is added to the group. The agent can include third party services such as those provided by Slack®, Salesforce®, and the like.

In some embodiments, a message aggregator app such as app 122 of FIG. 1 is used to deliver an invitation code to user. Returning to FIG. 4, User A's device has a message aggregator app that can connect to Message Aggregator 450, and retrieve the invitation code or messages. An invitation code can be used to join a group by delivering the invitation code to a user's preferred messaging app. In Google Android® OS, for example, a message aggregator app can inject the SMS message to an Android® SMS app provided that the Android® SMS app has granted permission to receive SMS messages. In Apple iOS®, for example, an iMessage® extension delivers the invitation message to a user using the iMessage® app.

In some embodiments, a user can create a group from a messaging app directly. An example of messaging-initiated group creation is shown in the following figure.

FIG. 5 is a block diagram illustrating an embodiment of a process for creating a group to converse across fragmented messaging services. The process shown here illustrates how Group 410 of FIG. 4, including User A, User B, Agent, and Integration Apps, is formed. The process shown here also corresponds to the system shown in FIG. 1. Each of the components function like their counterparts in FIG. 1 unless otherwise described.

User A sends a request to create a group from a messaging app, here Message App 1 (502). The request is processed by message aggregator 550. The message aggregator 550 sends a response back to User A, which is received at Message App 1 (504). In various embodiments, the response to the request includes URLs or messages for User A.

User A can share the contents of the response message to invite others to join the group. The message contents such as an invitation with a group identification message can be disseminated by forwarding as SMS, Email, or other methods. User A can invite other users to join the group using the same messaging platform (here Message App 1) as the one where the response message was received or by using a different messaging platform. Here, User A invites User B to join the group using Message App 2 (506), which is the same platform as the one User A is using. When User B receives the invitation, User B can click a link in the invitation to open a web page to connect with message aggregator 550 web chat. Here, clicking the link causes a Web browser to open up a corresponding page "invitation" to view the invitation and initiate a web chat (508). For example, User B can access a linked page to connect using websocket or the like. A web page can operate as Web chat client.

Figures 15A, 15B, 15C:
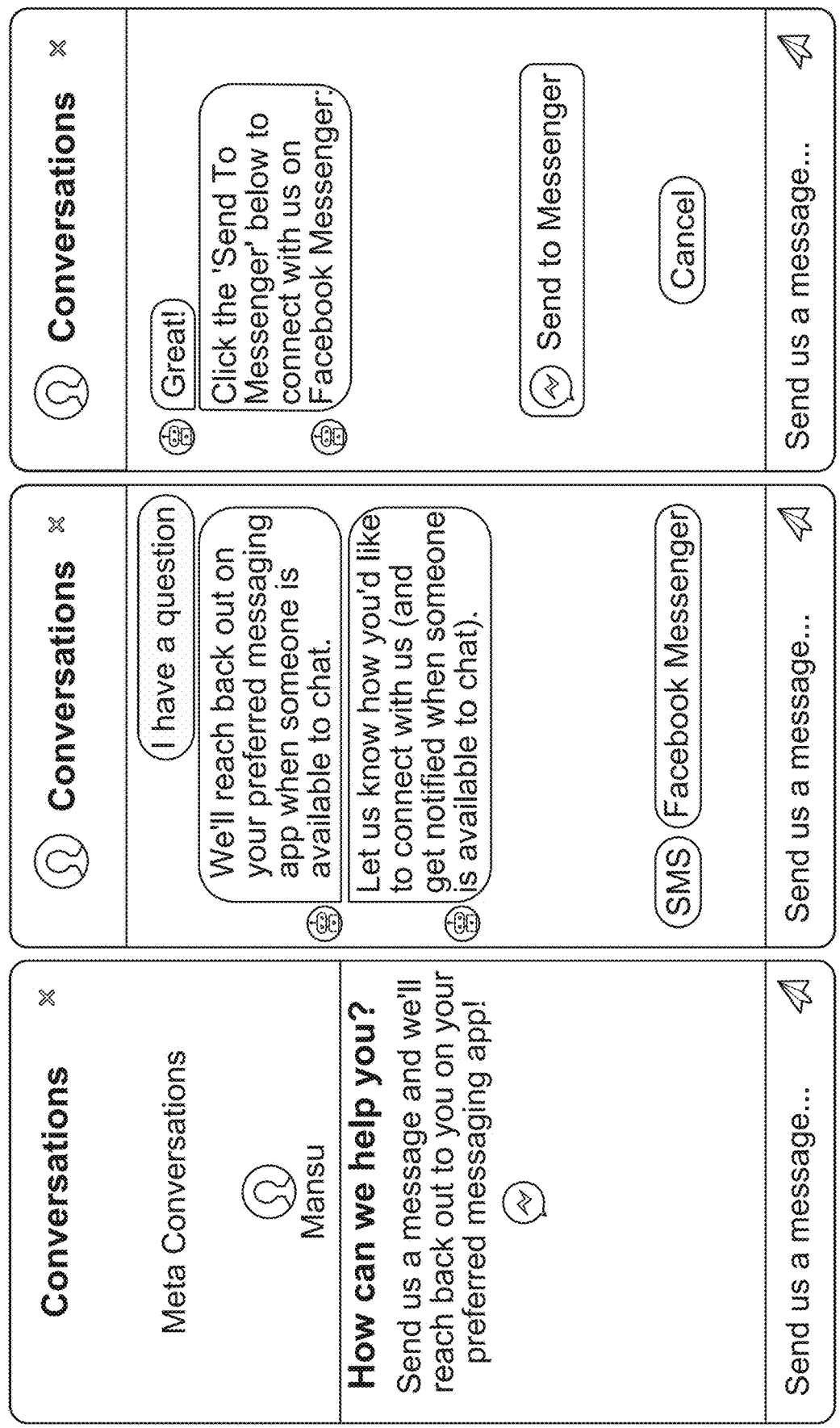
FIG. 15A is an example GUI for inviting a user to converse.
FIG. 15B is an example GUI for inviting a user to converse in which message service options are displayed.
FIG. 15C is an example GUI for inviting a user to converse in which a link for message service is displayed.

Suppose User B now wants to continue the conversation by his Message App instead of the Browser. For example, User B is leaving an area with Wi-Fi connectivity and now only has SMS (an example of Message App). To continue the conversation, User B requests a link for Message App (510). For example, User B launches Browser to send a message to Message Aggregator 550 letting the message aggregator know that he wants to switch to Message App, e.g., by using a REST API. An example GUI is shown in FIG. 15C. The Message App can be associated with the user by a process such as the one shown in FIG. 8. This causes a channel to be established between User B's Message App and Message Endpoint 2, which is the endpoint in message aggregator 550 that handles the message platform corresponding to User B's Message App.

In this example, it is also possible to have agent integration like 416 of FIG. 4. For simplicity, it is not shown or discussed here, but the example described in FIG. 4 applies equally here.

In some embodiments, the invitation process shown in FIG. 5 can be used by a user to add different messaging platforms associated with the same user. For example, User A starts a group with Facebook® Messenger, and later wants to add text messaging as a channel. User A can use Facebook® Messenger to send an invitation to her own phone number to connect to the group. When a user has multiple messaging channels, the user has an option to merge messaging channels, a further described with respect to FIG. 8.

The following figure shows an example of how a prospective group member joins a group.

FIG. 6 is a flow chart illustrating an embodiment of a process for joining a group, where members of the group can converse across fragmented messaging platforms. Various types of information can be used to identify a group that a user is looking to join. The process shown here can be implemented by a message aggregator such as the one shown in FIG. 1.

At 602, a join group request without a token is received. If a request is accompanied by a token, the group that is sought to be joined can be easily identified using the token. However, this process is able to identify a group even without a token in the initial join group request.

At 604, the user obtains a token. For example, the user requests a group membership token, which identifies a group that the user wishes to join. In some embodiments, a conversation group may handle a user's private or financial data before the user accesses the conversation channel. The user is authenticated by sending a token to the user (e.g., via email) and the user will use the token to verify her identity. The token might not be specific to a channel and not specific to the user. Suppose a company runs training classes across store branches every month, and after class, there is a virtual class conversation for each store branch. The company has a list of all students, but the students have not yet joined the conversation channel. All users are invited to join the conversation group, e.g., "joinClassCompanyA." A user can identify the specific class conversation group to join by providing a token. The token identifies the class by, e.g., class number, store branch location, photo of classroom, QR code, or the like.

At 606, the user's token is received. Several types of tokens can be handled by the process to identify a matching group. Examples of tokens by which a group can be identified are (without limitation) text, media, location, contacts. For example, a token in the form of an URL code or QR code can be used to look up an URL of an associated group. A token in the form of location such as GPS coordinates can be used to look up a group in the vicinity of the location or associated with the location. A token in the form of a photo, series of photos, or video can be used by extracting information from the photo or video and looking up matching groups. A token in the form of audio can be used to extract an object or text to look up matching groups. A token in the form of a data string can be used to look up groups matching the string such as keywords, names, or members of the group with that string.

At 608, a matched group is found based at least in part on the user's token. A message aggregator such as the one shown in FIG. 1 is configured to determine information from the token using a lookup table or other data structure that stores token information. For example, if the token identifies a camera model, a group of users all with the same camera can be identified as a matched group. Depending on settings and preferences, a single matching group is identified or, several groups can be identified.

At 610, it is determined whether automatic group creation is enabled. If so, then a group is automatically created (612). Otherwise, if automatic group creation is disabled (or a create group API is not applicable), then a group is not created and instead the user is prompted to join a matched group (614).

The tokens described here can be stored in a system such as Group Identification 184 of FIG. 1.

The following figure shows an example of how a message is processed by a message aggregator.

Figure 7:
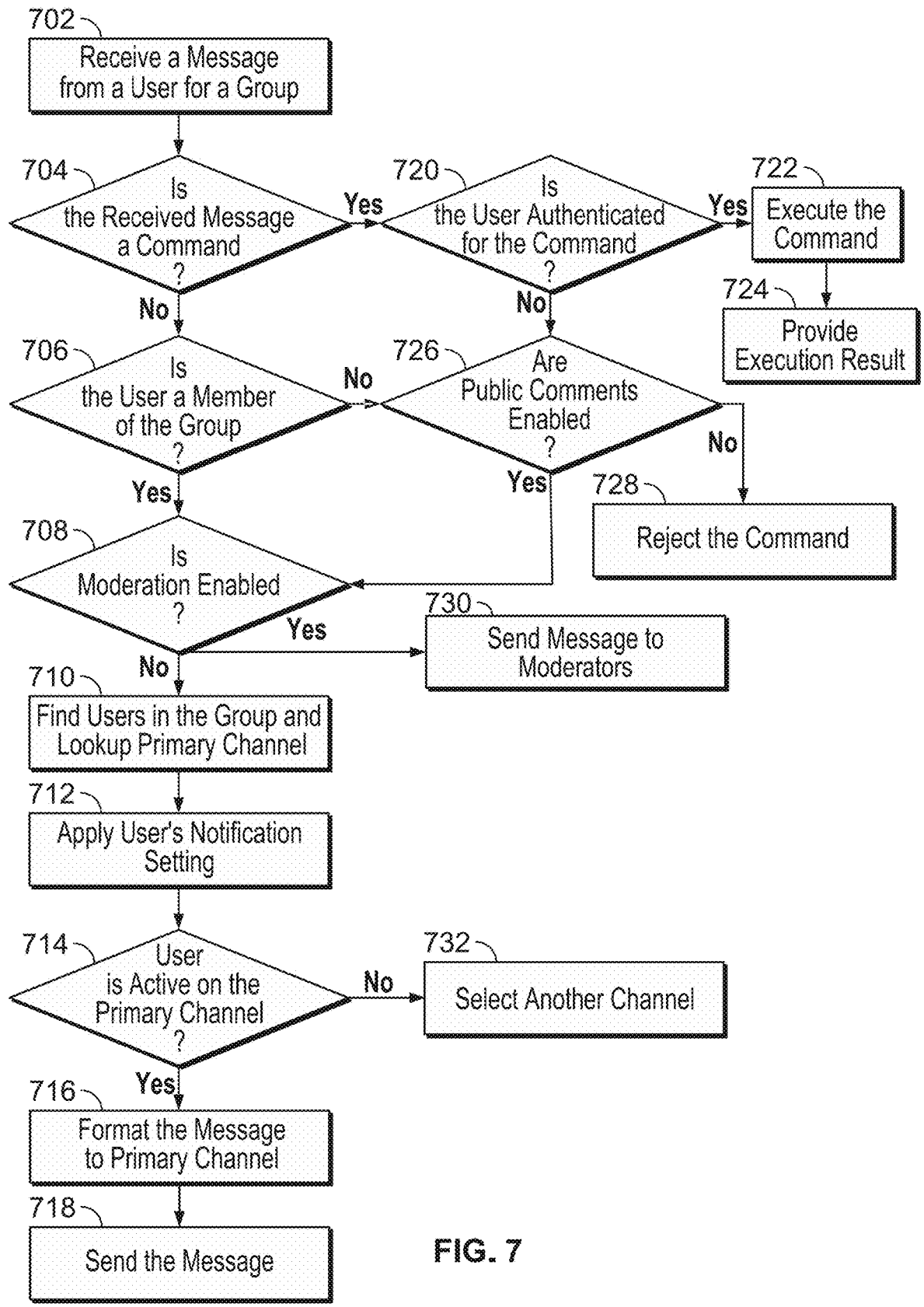
FIG. 7 is a flow chart illustrating an embodiment of a process for processing a message in a conversation across fragmented messaging platforms.

FIG. 7 is a flow chart illustrating an embodiment of a process for processing a message in a conversation across fragmented messaging platforms. In this example, the purpose of a message is determined (e.g., does it include a chat command), then the message aggregator determines whether the message is permitted to be sent and whether group moderation is enabled. Finally, if the message can be sent, the message is conformed to each of the recipient group member's notification preference. The process shown here can be implemented by a message aggregator such as the one shown in FIG. 1.

At 702, a message is received from a user for a group (702). At 704, it is determined whether the received message is a command. For example, the message aggregator determines whether the received command is a chat command. The chat command format may depend on the message platform. For example, in a simple SMS channel, the command can be a string like "mute" or "invite user." In a model messaging channel (e.g., Facebook Messenger®), the command can be a unique GUID, which maps to the command of the channel. If the received message is not a command, it is determined whether the user is a member of the group (706). If the user is a member of the group, then it is determined whether moderation is enabled (708).

Moderation can be enabled by a setting of a web site or group. For example, some online forums are moderated, meaning that member posts are screened before they are published rather than automatically published. If moderation is enabled, then the message is sent to the moderators (730) for review. Otherwise, if moderation is not enabled, then users of the group are found and the primary channel is looked up (710). The primary channel and users are looked up to prepare to send the message over preferred channels to recipients in the associated group. Referring to FIG. 1, members and their preferred channels are looked up in database 182.

In some embodiments, a group administrator creates a group as a moderated group, and sets an agent as moderator. This causes messages from group members (such as User A and User B here) to be delivered to the agent instead of directly between users. The agent can access the message using a variety of messaging platforms such as business-friendly messaging tools (Slack®, Skype®, Microsoft Lync®, Intercom® Live Chat, and the like). The agent can take one or more moderation actions such as reply, forward to another user/moderator, broadcast, or drop the message. If a user has multiple messaging apps on a device, the message aggregator can detect all of the messaging apps that the user uses including the one that the user prefers, e.g., by scanning the user's device if the user has granted permission. The preferring messaging app may be the one that is used most frequently by a user, used most frequently by the user for a specific purpose, or based on a usage pattern (user is active, during work hours vs. off-hours, for example). The message aggregator, in various embodiments, sends a push notification to a most recently used channel instead of sending it to a first-accessed channel, because the user is more likely to see the message on the most recently used channel instead of the first-accessed channel. In some embodiments, the message aggregator can try several channels. For example, the message aggregator first uses a channel with the highest predicted success of the user seeing the message, and, if there is no action taken by the user, then waits to try another channel.

In some embodiments, a message is not broadcasted to the group until the message is moderated by the moderator. The moderator can take various actions such as moderating the message before approving the message for broadcasting or reply only to the user. In various embodiments, moderation can be performed by one or more users, an integration app, or a combination. In some embodiments, the author of a message is automatically notified that his message is being moderated. An example of a graphical user interface for commenting in online discussions is shown in FIG. 10A.

At 714, it is determined whether the user is active on the primary channel. Suppose User A has three channels (Facebook Messenger®, SMS, and email), and begins a conversation on Facebook Messenger®, but then signs off. When the user signs off, she is no longer active. Whether a user is active can also or instead be detected based frequency or how recently the user sent messaging on that channel. The user may make a setting to receive notifications via another channel.

If the user is not active on the primary channel, then another channel is selected (732). That is, in case the user is not active on the primary channel (e.g., does not respond via the first channel within a threshold time), then another channel (here, SMS or email) is used to deliver the message to User A.

Otherwise, if the user is active on the primary channel, then the message is formatted to the primary (also called "preferred") channel (716). For example, the message can be adjusted to suit the reading format of the message app corresponding to the primary channel. The message can be formatted in several ways to adapt to the preferred (primary) channels of each of the recipient users. At 718, the message is sent. The message is sent over the primary channel to each of the users.

Returning to 704, if the received message is a command, then it is determined whether a user is authenticated for the command (720). Authentication can be checked in a variety of ways including, without limitation, by comparing credentials with a list of authorized users, checking an identity of the user against a blacklist, posing a quiz question to verify that the user is not a robot, and the like. If the user is authenticated, then the command is executed. An example command is posting a reader comment to a news article. In some embodiments, the execution result is provided (724). For example, if successful execution is not readily apparent as in the case of a comment being posted to a news article, a confirmation of successful execution is provided.

However, if the user is not authenticated at 720, then it is determined whether public comments are enabled (726). The allowability of public comments can be predefined by a web page or group at the time it was created or some other time. If public comments are not enabled, then the command is rejected (728). Otherwise, if public comments are enabled, then the process proceeds to 708 in which it is determined whether moderation is enabled, as described above. Message distribution can depend on notification settings and time zone of a user, so notifications are not sent during certain hours or if a user is not interested in certain topics.

The following figure shows an example of merging multiple messaging channels associated with the same user.

Figure 8:
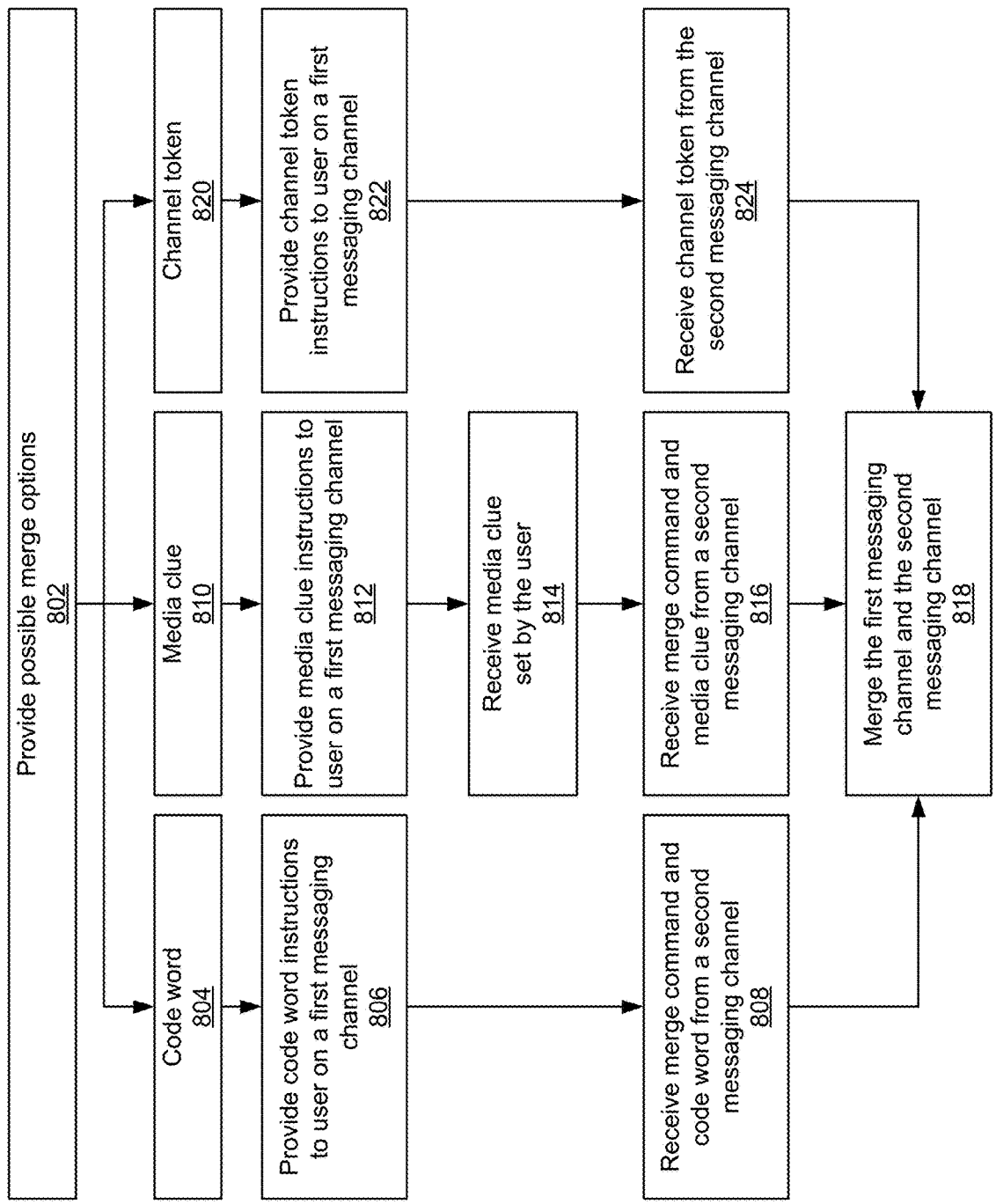
FIG. 8 is a flow chart illustrating an embodiment of a process for merging accounts belonging to the same user.

FIG. 8 is a flow chart illustrating an embodiment of a process for merging accounts belonging to the same user. A specific user may have several messaging apps or devices, and each of these apps or devices may have a different account although they all correspond to the same identity of the specific user. User accounts can be identified and merged to facilitate conversations across fragmented messaging platforms. This can improve user experience including reduce user frustration. For example, when user accounts are not merged, the user will receive multiple copies of the same message. When the user accounts get merged, then a single copy of the same message can be sent, e.g., over a preferred channel. The process shown here can be implemented by a message aggregator such as the one shown in FIG. 1.

At 802, possible merge options are provided. The possible merge options are different ways by which a user's channels can be merged. Here, three example possible merge options are provided. A first type of merge option uses a code word (804). Code word instructions are provided to the user on a first messaging channel (806). For example, the user is instructed to use a code word (e.g., #merge-A32BC) by opening a second messaging channel (the one to be merged with the first messaging channel) and sending a merge command with the code word. When a merge command is received from the second messaging channel with this code word, the first messaging channel and second messaging channel are merged (818). The code word identifies to the message aggregator that the first messaging channel and the second messaging channel are both associated with the same user.

A second type of merge option uses a media clue (810). A media clue is an image, voice, location, or other information that associates an unrecognized messaging channel with a recognized message channel both corresponding to the same user. At 812, media clue instructions are provided to a user on a first messaging channel. For example, the user is informed that her merge clue can be set by sending an image like a platform avatar or photo, voice clip, location, or other identifying information. Information like location can link the user's devices. For example, a user's device ID (accessible from Android® for example) can provide proximity to link users from Android mobile web browser to SMS text. The media clue is like a signature that identifies the user when it is provided by the user. In response to this instruction, a user sends the media clue. At 814, the media clue set by the user is received. Later, when the user sends the media clue form another messaging channel, this will identify the same user as having several messaging channels. At 816, a merge command and media clue are received from a second messaging channel. When a merge command is received from the second messaging channel with the media clue, the first messaging channel and second messaging channel are merged (818).

A third type of merge option uses a channel token (820). A channel token can be sent to a user on a first messaging channel, then provided by the user via a second messaging channel to merge the first and second messaging channels. At 822, channel token instructions are provided to a user on a first messaging channel. For example, the user may be instructed to paste the channel token when prompted. For example, when the user attempts to communicate with other users via the second messaging channel, she will be prompted to paste the channel token that was sent to her on the first messaging channel. When a merge command is received from the second messaging channel with the channel token (824), the first messaging channel and second messaging channel are merged (818). Suppose a user on Facebook Messenger® decides to use SMS to follow up on a conversation. The user clicks a link to connect SMS, which has a unique ID associated with the user. For example, the timestamp of the click can be used, and the "time proximity" or time different meeting a threshold between the link click and user request made on another channel can be used to determine that the channels are associated with the same user.

At 818, the first messaging channel and the second messaging channel are merged, meaning that they are both associated with the same user. This information can be stored by a message aggregator such as the one shown in FIG. 1 in a formed groups database such as the one shown in FIG. 1. Messaging may continue to be sent along separate channels, but when a message is potentially a duplicate, meaning that the message has already been sent, the message aggregator will check channels to see if they are "merged." Merged channels indicate association with the same user, and the messaging will be send on a primary (or preferred) channel instead of on all channels, in various embodiments.

Although not shown, prior to 802, an account merge command may be initiated. Upon receipt of the merge command, it is determined which merge method (804, 810, 820) to use. For example, the syntax of the command may indicate the type of merge to perform.

In a travel use case, a group can be created by an agent after user complete a travel reservation. For example, User A and User B are traveling together. A travel agent vendor creates a group for User A and User B to share reservation information and discuss the trip. The travel agent's customer support agent can use group messaging to communicate with Users A and B. The chat group can also be extended by the members, e.g., user B may invite user C to the group without losing the history of the conversation. The vendor can also provide an automated answering bot service to the group when a live agent is not available. For example, an integration app like the one shown in FIG. 1 provides a group poll about preferred travel date to group. After the poll is finished, the agent can book a hotel and perform other actions. Surveys/polls can be provided at various times such as after an interaction, on a schedule (quarterly), etc. For example, while User A and User B are discussing travel plans, the automation app can present related links or media (e.g., photos, videos) to help the user make an informed decision.

Suppose a user books a rental car from a rental car agency a few weeks before her trip. The message aggregator described above is configured to coordinate the conversations between the rental car agency and the user. At the time of booking, the user indicates that her preferred messaging service is Facebook Messenger®. The rental car agency can remember this preference and chiefly interact with the user via her preferred messaging service. More specifically, an integration app of the message aggregator can store the user's preferences. A few days before the trip, the rental car agency sends the user a reminder of her rental car booking via Facebook Messenger®, and provides add-on options inside Messenger. For example, she can be offered insurance, a car seat, GPS, etc. The reminder can be automatically sent by the integration app of the message aggregator. The user can select the offered add-ons directly in Messenger. The message aggregator will receive the selection and update the user's booking accordingly.

The rental car agency can provide continued customer support throughout the trip. For example, after the user picks up the car and a day into the trip, the integration app sends a Facebook® message to the user on behalf of the rental car agency checking to see if everything is going well. Suppose the user messages back that the AC is not cold enough. The integration app detects that the user has flagged an issue and can bring in a support agent. The support agent is added to the group conversation and helps to resolve the AC issue. From the perspective of the user, the issue is resolved in her preferred messaging service, Facebook Messenger®. The support agent may be using a web browser to converse with the user, and the message aggregator will format all messages for Facebook Messenger® and send them to the user on her preferred channel. After the issue is resolved, the integration app may provide additional follow up, for example by automatically sending a survey. The survey can be completed in Facebook Messenger®. For example, common responses (rate the support agent on a scale of 1-5) can be suggested to the user. After the trip has ended, the integration app may send a final survey to the user via another messaging channel such as email. The final survey may take into account the previous feedback regarding the AC. Completing the survey and clicking a submission link may then open a Web page for the user to provide a Google® review of the rental car agency. The message aggregator coordinates conversation between the rental car agency, the support agent, and the user so that the user's experience is seamless across her messaging services.

In some embodiments, messaging platforms allow payments to be made between users or for services. For example iMessage® provides a payment service for iMessage® users, Facebook® Messenger provides a payment service for Facebook® users, WeChat® supports WeChat® Pay, and Kakao® supports KakaoPay®. However, conventionally, payment services are not transferable between platforms. By contrast, the message aggregator described here allows payments to be made between users of different messaging platforms. For example, when a message platform endpoint like the ones shown in FIG. 1 receives platform-specific payments, it records the transaction and can pass the payment to the user or service and provide escrow intermediary service. When a group is paying for travel, payment from each user will be converted and paid to the service provider. The message aggregator can be configured to enforce regulations such as country-specific caps on money transfer, perform currency conversion, and the like.

Figure 9:
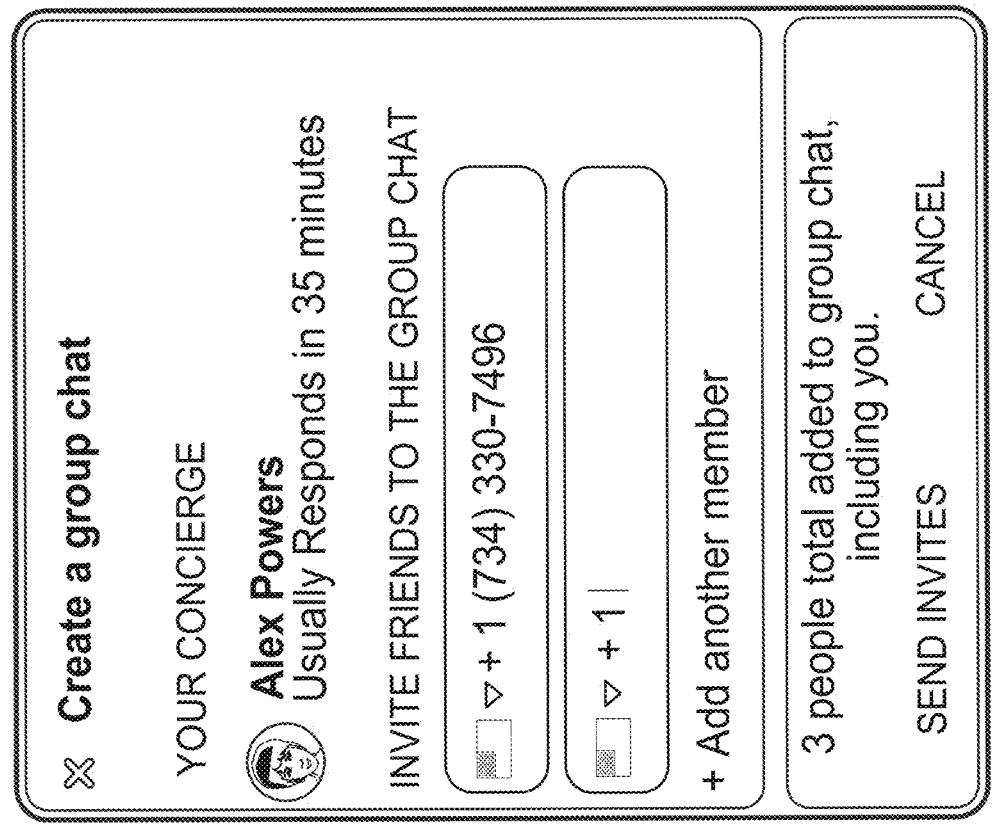
FIG. 9 is an example graphical user interface (GUI) for inviting users to join a system for conversing across fragmented messaging platforms.

FIG. 9 is an example graphical user interface (GUI) for inviting users to join a system for conversing across fragmented messaging platforms. In some embodiments, the GUI shown here is used by a user to create a group chat or invite users to a group. More specifically, in this example, a user invites other users using SMS. The group already includes a support agent (here, Alex Powers, the concierge). As shown, a user can enter one or more phone numbers. When the user inputs the phone numbers and selects "send invites," an invitation with a group identification message is sent to the phone numbers as text messages. When the user inputs email addresses, the invitations are distributed to the email addresses. When the user inputs Twitter® handles, the invitations are distributed via Twitter®. Examples of invitations include a link, media clue such as a scannable code, a token, and the like as more fully described above.

Figure 10:
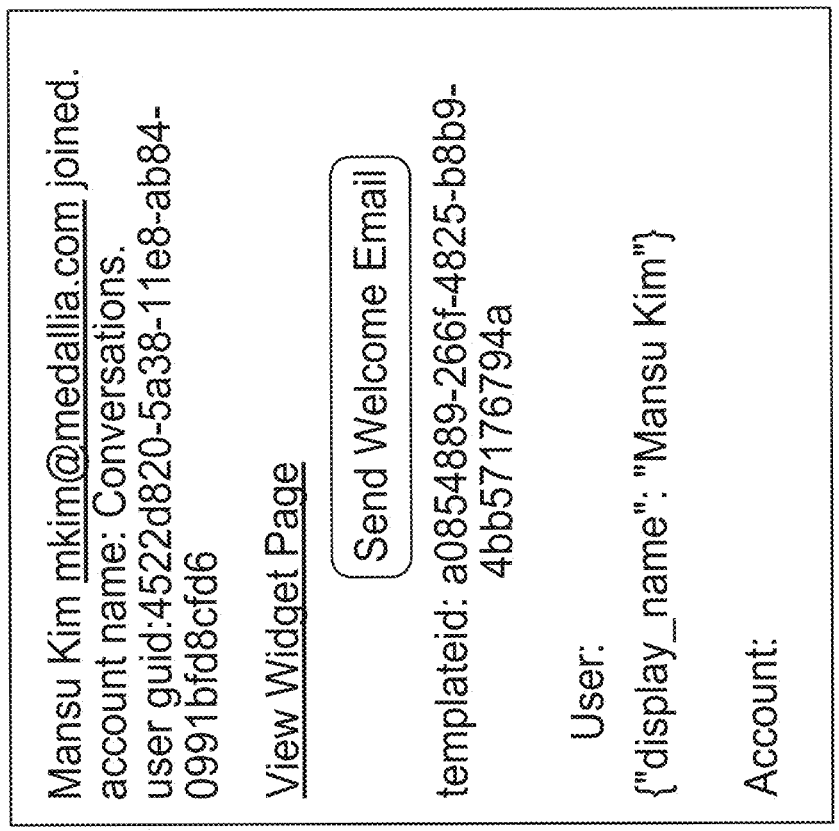
FIG. 10 is an example graphical user interface (GUI) notifying a first user that a second user has joined a group.

FIG. 10 is an example graphical user interface (GUI) notifying a first user that a second user has joined a group. For example, a first user uses the GUI shown in FIG. 9 to invite Mansu Kim to join the group chat. When Mansu joins, the first user receives a notification. FIG. 10 is an example of the notification that the first user receives. The first user can then send a welcome email to the second user (here, Mansu). The GUI also shows additional information such as the second user's email address and GUID.

Figure 11A:
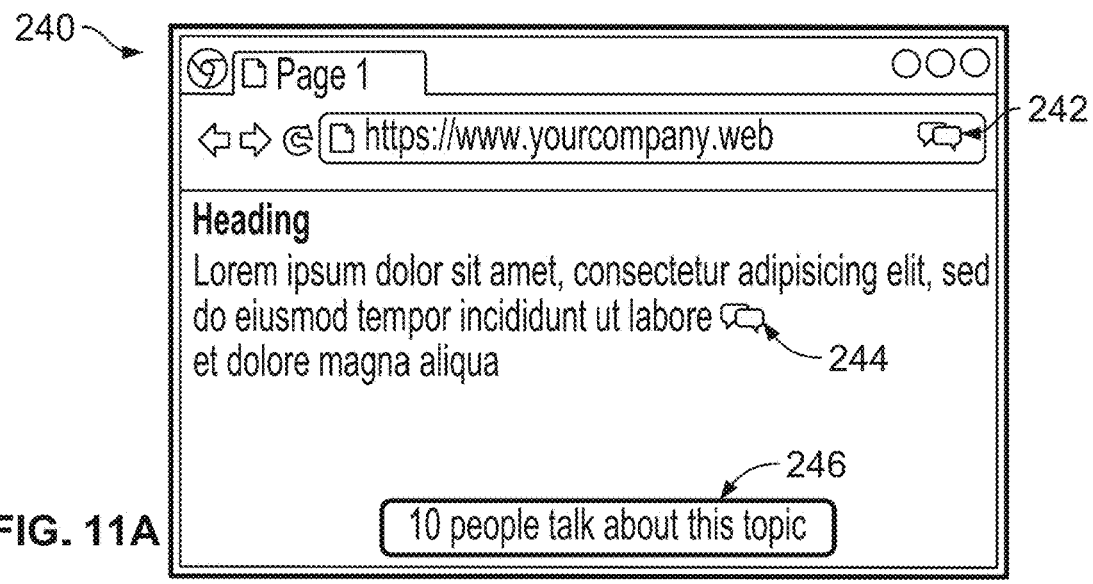
FIG. 11A is an example GUI of a system for conversing across fragmented messaging platforms.

FIG. 11A is an example GUI of a system for conversing across fragmented messaging platforms. In some embodiments, the GUI shown here is used by a user to participate in an online discussion. The example GUI shows top-level browser interaction components, and may include a browser add-on, JavaScript plugin, and conversation box.

The GUI includes browser plug-in 242, which persists on the browser 240. Some web browsers (e.g., Google Chrome®) allow this browser plugin to interact with the page and facilitate user interaction. In this case, this browser plugin can be used to allow group chat or discussion for the site. The GUI includes a Web plug-in 244, which can be embedded by the Web site developer. For example, the Web site owner can add a JavaScript plugin to support a group chat triggered from HTML content. The message aggregator's message platform endpoint (e.g., browser endpoint 158 of FIG. 1) can host the runtime of the JavaScript for this service. The GUI includes a Web chat launcher and status bar 246. If the group is public, webchat launch may show the number of users or number of discussions to promote to group chat.

In various embodiments, browser 240 is configured to start discussion browser plugin 242, HTML web button 244, and HTML add-on 246 in several ways. For example, browser plugin 242 can be installed by a user to enable discussion from any site. When browser plugin 242 is enabled, the discussion is not limited to a website owner's action to enable certain topic-limited discussions. HTML web button 244 can be placed near the content to be discussed. This may be added by a site owner or automatically added by browser plugin 242 or HTML add-on 246. HTML add-on 246 is, in various embodiments, a small JavaScript add-on that a website owner or browser plugin 242 can add. Each of these components can be expanded as shown in FIG. 11B.

Suppose a user finds interesting topics they want to comment on the web browser 240. The user clicks the discussion (or group chat) button 242 244 246 on the web browser 240 to see the discussions (or group chats) and submit comments. The user has an option to continue the conversation using mobile messaging. When the user chooses to use mobile messaging, all discussions (or group chats) are connected and available from the user's preferred mobile messaging platform. After the user is connected through mobile messaging, the user is notified on the mobile messaging platform using the notification mechanism provided by the messaging platform when there are new discussions (or group chats). Using this pushed notification, the user can respond to the discussion (or group chats) without having to login to a Web browser or desktop. A message aggregator formats messages for mobile messaging platforms to provide the mechanism of delivering messages. When the user is using multiple messaging platforms, the message aggregator connects the different messaging identities to create a single user identity (e.g., as described for FIG. 8).

A discussion (group chat) can be conducted in several modes such as a moderated mode, private mode, and agent request mode. In a moderated mode, the group moderator filters messages from users. In a private mode, members of a private group within a group can chat with each other without involving the other members of the group. In an agent request mode, if the user chooses to talk to an agent, the user can send a request to the agent. The mode can depend on the group identity, such as if the group is a public listed group, a public unlisted group, or private group with authentication. These group properties can be changed by group administrator. When a user sends a message to group, the message can be processed according to the process shown in FIG. 7, including message moderation, command execution, and broadcasting to a user with the option of selecting second priority channel.

Figure 11B:
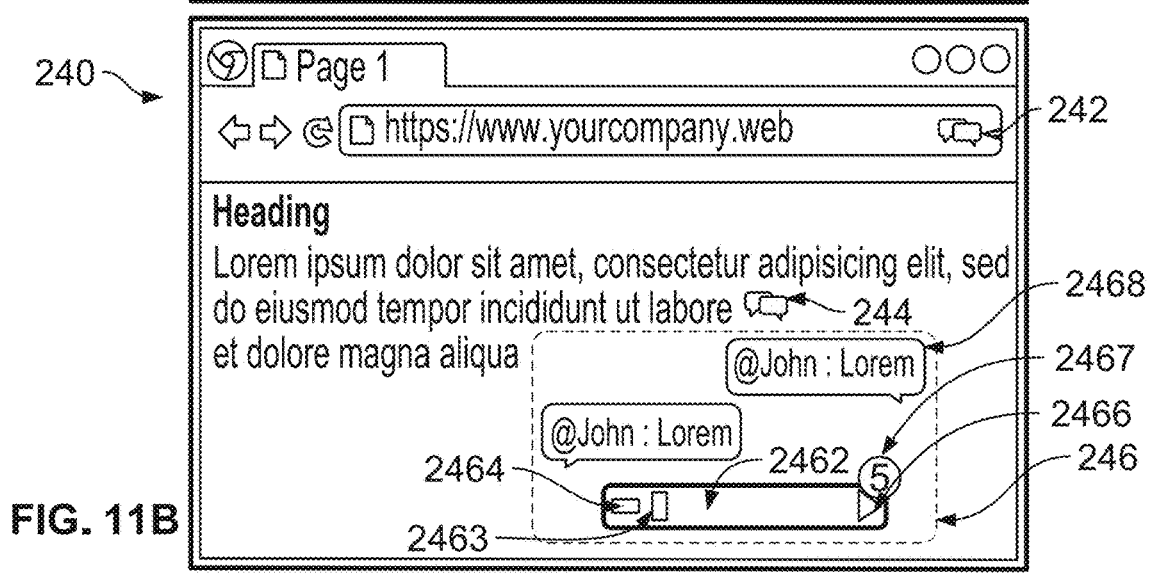
FIG. 11B is an example GUI of a system for conversing across fragmented messaging platforms.

FIG. 11B is an example GUI of a system for conversing across fragmented messaging platforms. In some embodiments, the GUI shown here is used by a user to participate in an online discussion. Here, an expanded browser view with an expanded conversation box is shown.

The GUI includes a webchat launcher and status bar 2462. If group is public, webchat launch may show the number of users or number of discussions to promote to group chat. The unexpanded form is 246 of FIG. 11A. The GUI includes a message input box in which A user can type to send the message in the message input box of the webchat launcher 2462. The GUI includes a button 2463 to send other media (e.g., image). The GUI includes a menu 2464 for the group chat. The menu can display a variety of thing such as a member list, show groups, show my groups, etc. The GUI includes a message send and connect button 2466. For example, if a user mouse overs the button, additional options like a continue conversation button to connect with messaging platforms is displayed. Alternatively, the messaging platform connect button can be constantly displayed. The GUI includes a chat message bubble 2468 configured to receive text input by a user to be sent as a message. The GUI includes a display 2647 of the number of unread messages.

The HTML, add-on shows that discussion 246 expands to discussion input 2462, discussion menu button 2464, discussion submit and continue 2466, unread discussions notification 2467 and discussion items 2468. Discussion submit and continue button 2466 or discussion menu button 2464 show the messaging buttons 2469. The messaging buttons 2469 show what messaging applications the user prefers and has installed on the user's devices.

Figure 11C:
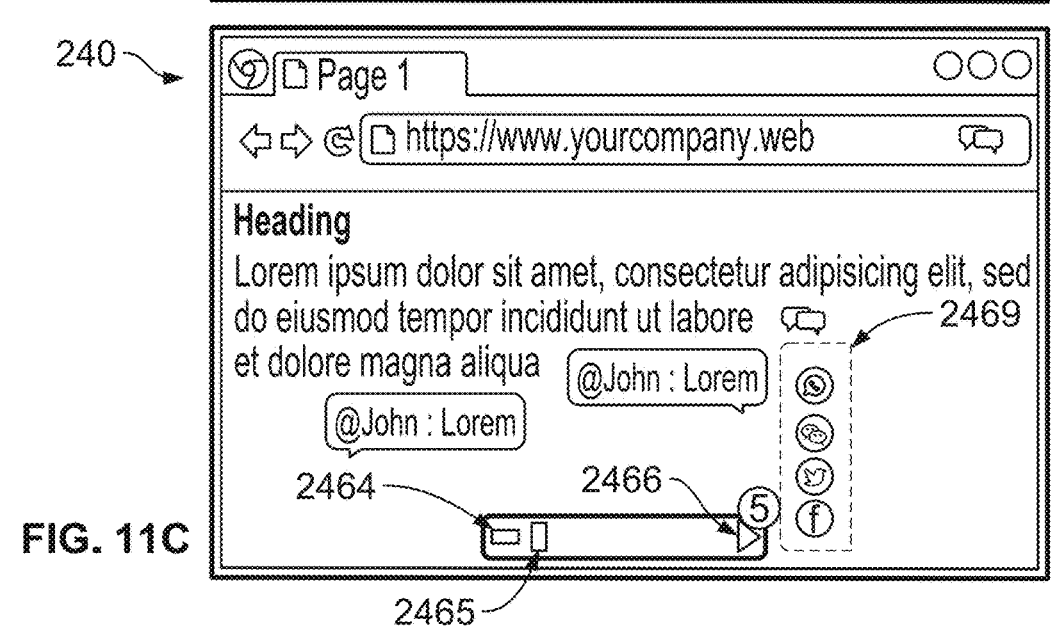
FIG. 11C is an example GUI providing an option to switch from a first messaging platform to a second messaging platform to converse across fragmented messaging platforms.

FIG. 11C is an example GUI providing an option to switch from a first messaging platform to a second messaging platform to converse across fragmented messaging platforms. In some embodiments, the GUI shown here is used by a user to participate in an online discussion. A connect messaging option allows a user to continue a conversation using a different messaging channel. For example, a user who began a conversation in a Web browser can connect with their SMS app to continue a group conversation using SMS.

The GUI includes a message send and connect button 2466, which functions like the one described in FIG. 11B. The GUI includes continue conversation buttons 2469. The buttons displayed may correspond to popular messaging platforms or messaging platforms that are detected on the user's device. The user clicks the button corresponding to the platform he wishes to switch to. For example, clicking the button may trigger the process shown in FIG. 8, which merges multiple messaging channels to associate several channels with the same user.

Figure 14:
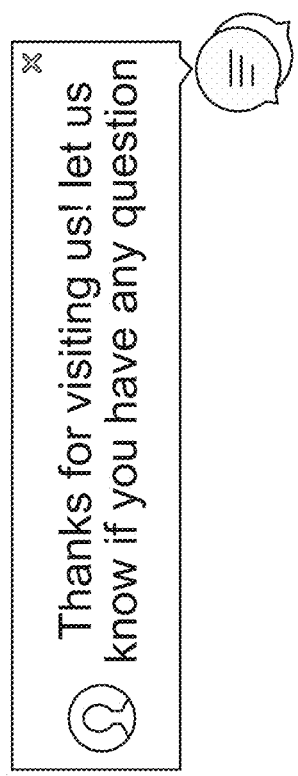
FIG. 14 is an example GUI for inviting a user to converse.

FIG. 14 is an example GUI for inviting a user to converse. For example, the message can be displayed on a web page or other app after a user visits the web page. An integration app may automatically display or send this message to invite the user to connect if he has any questions. Suppose the user has a question and clicks the dialogue button on the bottom right. Then, the GUI of FIG. 15A will be displayed.

FIG. 15A is an example GUI for inviting a user to converse. The GUI can be displayed on a web page or in an app. Here, an integration app may automatically invite the user to send a message, letting the user know that the response will be on his preferred messaging service. If the message aggregator is already aware of the user's preference, then the known preferred messaging service may be indicated by an icon (Facebook Messenger® here).

FIG. 15B is an example GUI for inviting a user to converse in which message service options are displayed. The GUI here shows that the user has sent a message, "I have a question." An integration app automatically responds that a support agent will reply back to the user. Suppose the message aggregator does not know the user's preferred messaging service or wants to confirm the preferred messaging service. Then, several messaging service options may be displayed. Here, the user can click on "SMS" or "Facebook Messenger," to select the messaging service on which the support agent will contact the user.

FIG. 15C is an example GUI for inviting a user to converse in which a link for message service is displayed. Suppose the user sends a message indicating that he wishes to continue the conversation on Facebook Messenger®. An integration app acknowledges this and send the user a link. When the user clicks the send to Messenger link, the user can continue the conversation on Messenger. This corresponds to 510 of FIG. 5.

In some embodiments, the examples of user interfaces shown in FIGS. 9-15C show different aspects of the same embodiment of a system for conversing across fragmented messaging platforms.

Figure 16:
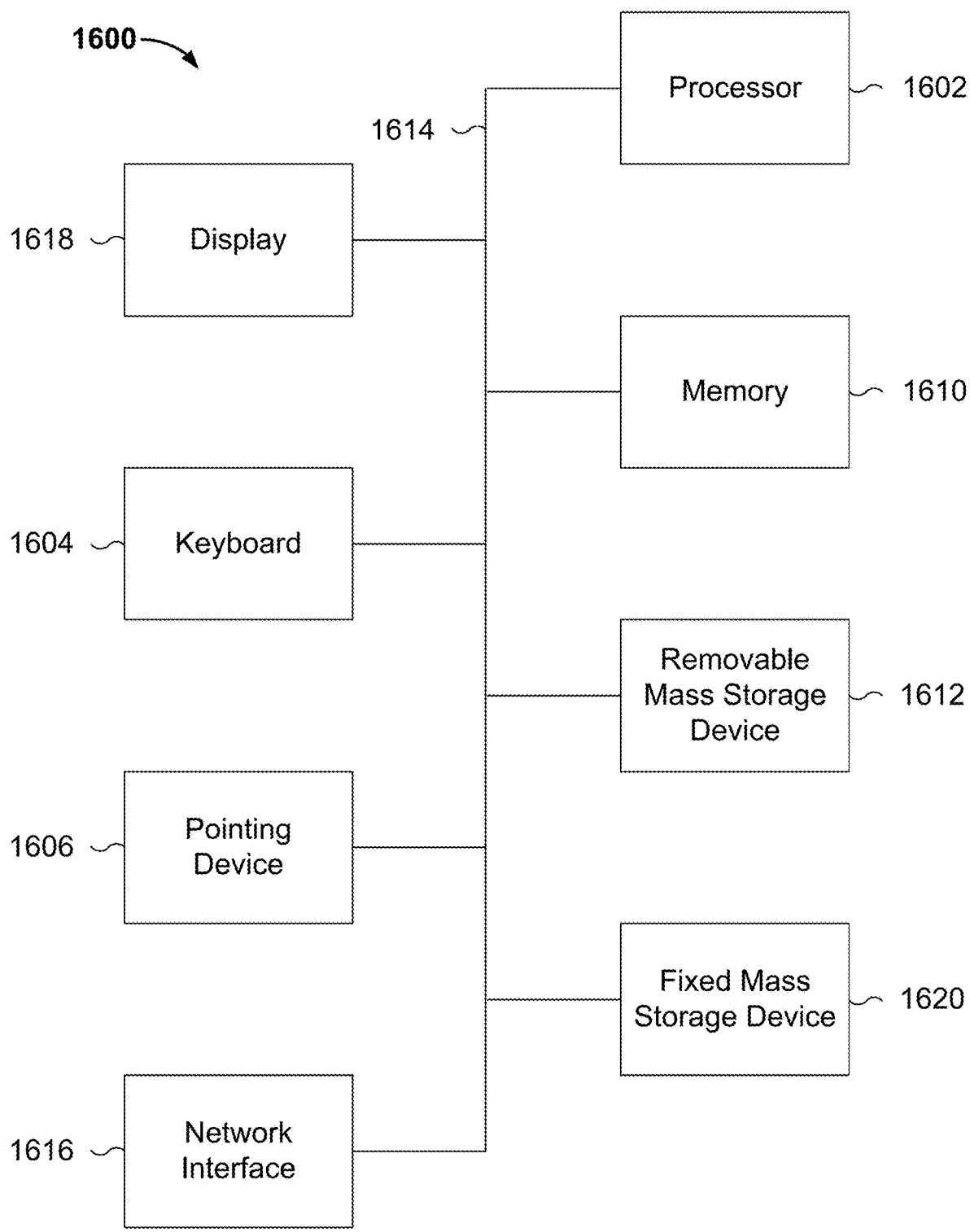
FIG. 16 is a functional diagram illustrating a programmed computer system for conversing across fragmented messaging services based on discussion topics in accordance with some embodiments.

FIG. 16 is a functional diagram illustrating a programmed computer system for conversing across fragmented messaging services based on discussion topics in accordance with some embodiments. As will be apparent, other computer system architectures and configurations can be used to perform the described message conversing technique. For example, a message aggregator such as the one shown in FIG. 1 can be implemented by system 1600.

Computer system 1600, which includes various subsystems as described below, includes at least one microprocessor subsystem (also referred to as a processor or a central processing unit (CPU) 1602). For example, processor 1602 can be implemented by a single-chip processor or by multiple processors. In some embodiments, processor 1602 is a general purpose digital processor that controls the operation of the computer system 1600. In some embodiments, processor 1602 also includes one or more coprocessors or special purpose processors (e.g., a graphics processor, a network processor, etc.). Using instructions retrieved from memory 1610, processor 1602 controls the reception and manipulation of input data received on an input device (e.g., image processing device 1606, I/O device interface 1604), and the output and display of data on output devices (e.g., display 1618).

Processor 1602 is coupled bi-directionally with memory 1610, which can include, for example, one or more random access memories (RAM) and/or one or more read-only memories (ROM). As is well known in the art, memory 1610 can be used as a general storage area, a temporary (e.g., scratch pad) memory, and/or a cache memory. Memory 1610 can also be used to store input data and processed data, as well as to store programming instructions and data, in the form of data objects and text objects, in addition to other data and instructions for processes operating on processor 1602. Also as is well known in the art, memory 1610 typically includes basic operating instructions, program code, data, and objects used by the processor 1602 to perform its functions (e.g., programmed instructions). For example, memory 1610 can include any suitable computer readable storage media described below, depending on whether, for example, data access needs to be bi-directional or uni-directional. For example, processor 1602 can also directly and very rapidly retrieve and store frequently needed data in a cache memory included in memory 1610.

A removable mass storage device 1612 provides additional data storage capacity for the computer system 1600, and is optionally coupled either bi-directionally (read/write) or uni-directionally (read only) to processor 1602. A fixed mass storage 1620 can also, for example, provide additional data storage capacity. For example, storage devices 1612 and/or 1620 can include computer readable media such as magnetic tape, flash memory, PC-CARDS, portable mass storage devices such as hard drives (e.g., magnetic, optical, or solid state drives), holographic storage devices, and other storage devices. Mass storages 1612 and/or 1620 generally store additional programming instructions, data, and the like that typically are not in active use by the processor 1602. It will be appreciated that the information retained within mass storages 1612 and 1620 can be incorporated, if needed, in standard fashion as part of memory 1610 (e.g., RAM) as virtual memory.

In addition to providing processor 1602 access to storage subsystems, bus 1614 can be used to provide access to other subsystems and devices as well. As shown, these can include a display 1618, a network interface 1616, an input/output (I/O) device interface 1604, an image processing device 1606, as well as other subsystems and devices. For example, image processing device 1606 can include a camera, a scanner, etc.; I/O device interface 1604 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 1600. Multiple I/O device interfaces can be used in conjunction with computer system 1600. The I/O device interface can include general and customized interfaces that allow the processor 1602 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 1616 allows processor 1602 to be coupled to another computer, computer network, or telecommunications network using a network connection as shown. For example, through the network interface 1616, the processor 1602 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 1602 can be used to connect the computer system 1600 to an external network and transfer data according to standard protocols. For example, various process embodiments disclosed herein can be executed on processor 1602, or can be performed across a network such as the Internet, intranet networks, or local area networks, in conjunction with a remote processor that shares a portion of the processing. Additional mass storage devices (not shown) can also be connected to processor 1602 through network interface 1616.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 16 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 1604 and display 1618 share the touch sensitive screen component, which both detects user inputs and displays outputs to the user). In addition, bus 1614 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing messages across a plurality of messaging services, comprising:
    receiving a first message from a first messaging service of a first user via a first messaging channel;
    converting the first message to a format associated with a second messaging service associated with a second user;
    sending the converted first message to the second user via a second messaging channel;
    receiving a second message from the second messaging service of the second user;
    in response to a request from the first user to continue a conversation via the second messaging service, establishing a third messaging channel to the second messaging service, wherein the third messaging channel is associated with an account of the first user on the second messaging service;
    in response to absence of receiving the request from the first user to continue the conversation via the second messaging service, terminating the conversation; and
    sending the second message via the third messaging channel to the first user.

2. The method of claim 1 further comprising:
    sending a survey, follow-on information, or both, from the first user to the second user.

3. The method of claim 2, wherein the sending of the survey is automatically performed by an integration application according to a schedule.

4. The method of claim 2, wherein the first user or the second user switches to messaging while interacting with the integration application.

5. The method of claim 1 further comprising determining whether the conversation is finished.

6. The method of claim 5, wherein the determining whether the conversation is finished is based at least in part on at least one of the first user and the second user disconnecting.

7. The method of claim 1, wherein the second messaging channel is a private messaging channel on which messages are transmitted between designated users but not other users of a group.

8. The method of claim 1 further comprising forming a conversation group by adding the first user and the second user to the conversation group.

9. The method of claim 1, wherein a conversation group includes the first user and the second user, and wherein the method further comprises:
    receiving a request from the first user to invite a third user;
    creating a group identification message to be sent to the third user;
    receiving an acceptance from the third user; and
    adding the third user to the conversation group.

10. The method of claim 9, wherein the group identification message includes a media item.

11. The method of claim 9, wherein the group identification message is either a URL or a scannable code.

12. The method of claim 9, wherein the group identification message is sent by the first user or second user to the third user.

13. The method of claim 1 further comprising:
    prior to the converting, identifying the second messaging service as a preferred messaging service associated with the second user.

14. The method of claim 13, wherein the converting the first message to the format associated with the second messaging service is in response to the identification of the second messaging service as the preferred messaging service.

15. The method of claim 13, wherein the identifying the second messaging service as the preferred messaging service is based on the second user prior usage of messaging services.

16. The method of claim 15, wherein the prior usage includes usage pattern.

17. The method of claim 1 further comprising authenticating the first user, and wherein the sending the first message to the second user is in response to successful authentication of the first user.

18. The method of claim 1 further comprising merging common contact information for a user such that messages are not duplicative.

19. The method of claim 1, wherein the first message is audio based or video based.

20. The method of claim 1, wherein the second message is audio based or video based.

21. The method of claim 1, wherein the first message is in a first format comprising an audio format, a video format, or a textual format, and wherein the second message is in a second format comprising an audio format, a video format, or a textual format, and wherein the first format is different from the second format.

22. The method of claim 1, wherein the first message is received as an email to a group alias.

23. The method of claim 1, wherein the first user and the second user are part of a first group, and the first message is sent to a second group of users.

24. The method of claim 1, wherein the first message includes a platform-specific function; and wherein the method further comprises:
    converting the platform-specific function to a common format; and
    replacing the platform-specific function with the common format in the first message prior to the sending the first message to the second user.

25. The method of claim 24, wherein the platform-specific function includes a platform-specific object including at least one of: a sticker and an emoji, and the converting the platform-specific object includes converting the object to an image format recognizable by the second messaging channel.

26. A system for managing messages across a plurality of messaging services, comprising:
a processor configured to:
receive a first message from a first messaging service of a first user via a first messaging channel;
convert the first message to a format associated with a second messaging service associated with a second user;
send the converted first message to the second user via a second messaging channel;
receive a second message from the second messaging service of the second user;
in response to a request from the first user to continue a conversation via the second messaging service, establish a third messaging channel to the second messaging service, wherein the third messaging channel is associated with an account of the first user on the second messaging service;
in response to absence of receiving the request from the first user to continue the conversation via the second messaging service, terminate the conversation; and
send the second message via the third messaging channel to the first user.

27. A computer program product embodied in a non-transitory computer readable storage medium and comprising computer instructions for:
receiving a first message from a first messaging service of a first user via a first messaging channel;
converting the first message to a format associated with a second messaging service associated with a second user;
sending the converted first message to the second user via a second messaging channel;
receiving a second message from the second messaging service of the second user;
in response to a request from the first user to continue a conversation via the second messaging service, establishing a third messaging channel to the second messaging service, wherein the third messaging channel is associated with an account of the first user on the second messaging service;
in response to absence of receiving the request from the first user to continue the conversation via the second messaging service, terminating the conversation; and
sending the second message via the third messaging channel to the first user.

* * * * *